(12) United States Patent
Kobayashi

(10) Patent No.: US 9,129,002 B2
(45) Date of Patent: Sep. 8, 2015

(54) DIVIDING DEVICE, DIVIDING METHOD, AND RECORDING MEDIUM

(71) Applicant: FUJITSU LIMITED, Kawasaki (JP)

(72) Inventor: Kenichi Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 13/740,704

(22) Filed: Jan. 14, 2013

(65) Prior Publication Data
US 2013/0185300 A1    Jul. 18, 2013

(30) Foreign Application Priority Data

Jan. 17, 2012 (JP) .................................. 2012-007568

(51) Int. Cl.
G06F 7/00 (2006.01)
G06F 17/30 (2006.01)
G06F 9/44 (2006.01)

(52) U.S. Cl.
CPC ............ G06F 17/30598 (2013.01); G06F 8/74 (2013.01); G06F 17/30994 (2013.01)

(58) Field of Classification Search
CPC   G06F 17/30598; G06F 8/74; G06F 17/30994
See application file for complete search history.

(56) References Cited

U.S. PATENT DOCUMENTS

| | | | |
|---|---|---|---|
| 2004/0107125 A1* | 6/2004 | Guheen et al. ..................... | 705/7 |
| 2004/0267686 A1 | 12/2004 | Chayes et al. | |
| 2009/0112825 A1* | 4/2009 | Xu et al. ............................ | 707/3 |
| 2009/0144319 A1* | 6/2009 | Panwar et al. ................ | 707/102 |
| 2010/0138414 A1 | 6/2010 | Newman et al. | |
| 2012/0096003 A1* | 4/2012 | Motohashi et al. ........... | 707/737 |

FOREIGN PATENT DOCUMENTS

| | | |
|---|---|---|
| JP | 2003-308216 | 10/2003 |
| JP | 2009-134379 | 6/2009 |
| WO | WO 01/35271 A2 | 5/2001 |

OTHER PUBLICATIONS

Australian Office Action issued Feb. 6, 2014 in corresponding Australian Patent Application No. 2013200232.
S. Ducasse and D. Pollet, "Software Architecture Reconstruction: A Process-Oriented Taxonomy", IEEE Transactions on Software Engineering. vol. 35, No. 4, 2009, pp. 573-591.
L. O'Brien et al., "Supporting Migration to Services using Software Architecture Reconstruction", 13th IEEE International Workshop on Software Technology and Engineering Practice (STEP'05), 2005, pp. 81-91.

(Continued)

Primary Examiner — Azam Cheema
(74) Attorney, Agent, or Firm — Staas & Halsey LLP

(57) ABSTRACT

A dividing device includes: a memory configured to store a program including a procedure; and a processor configured to execute the program, the procedure including: extracting correlation information from source code of software, the information correlating relationships between an originating entity of the relationship and a receiving entity of the relationship, which are identified by dependent relationships of a group of entities, which is the group of elements that structure the software, and dividing the group of entities into clusters, so as to be include in the cluster a lot of the dependent relationship which a weight related to the dependent relationships is large, based on the weight related to the dependent relationships identified by the correlation information extracted by the extracting.

19 Claims, 38 Drawing Sheets

(56) References Cited

OTHER PUBLICATIONS

A. Hamou-Lhadj et al., "Summarizing the Content of Large Traces to Facilitate the Understanding of the Behaviour of a Software System", 14$^{th}$ International Conference on Program Comprehension (ICPC'06), 2006, pp. 181-190.

M. E. J. Newman "Fast algorithm for detecting community structure in networks", Physical Review E 69 (6): 066133, 2004, 5 pages.

Gou Nakatsuka et al., "An Application of Component Rank Model to Software Clustering Algorithm", vol. 2007 No. 33 IPSJ SIG Technical Reports, Information Processing Society of Japan, Mar. 23, 2007, pp. 41-48, 8 pages [Abstract].

Japanese Office Action dated Jun. 23, 2015 in corresponding Japanese Application No. 2012-007568, 3 pages.

* cited by examiner

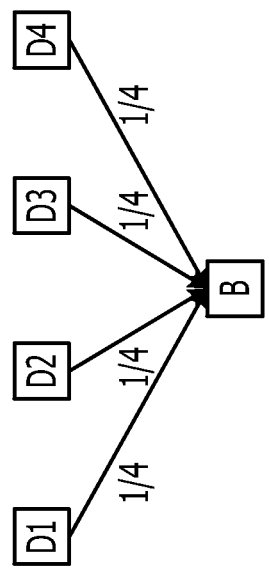
FIG. 2A
FIG. 2B
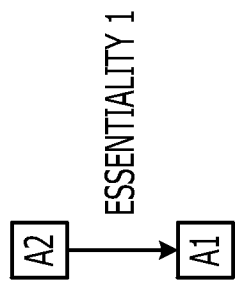
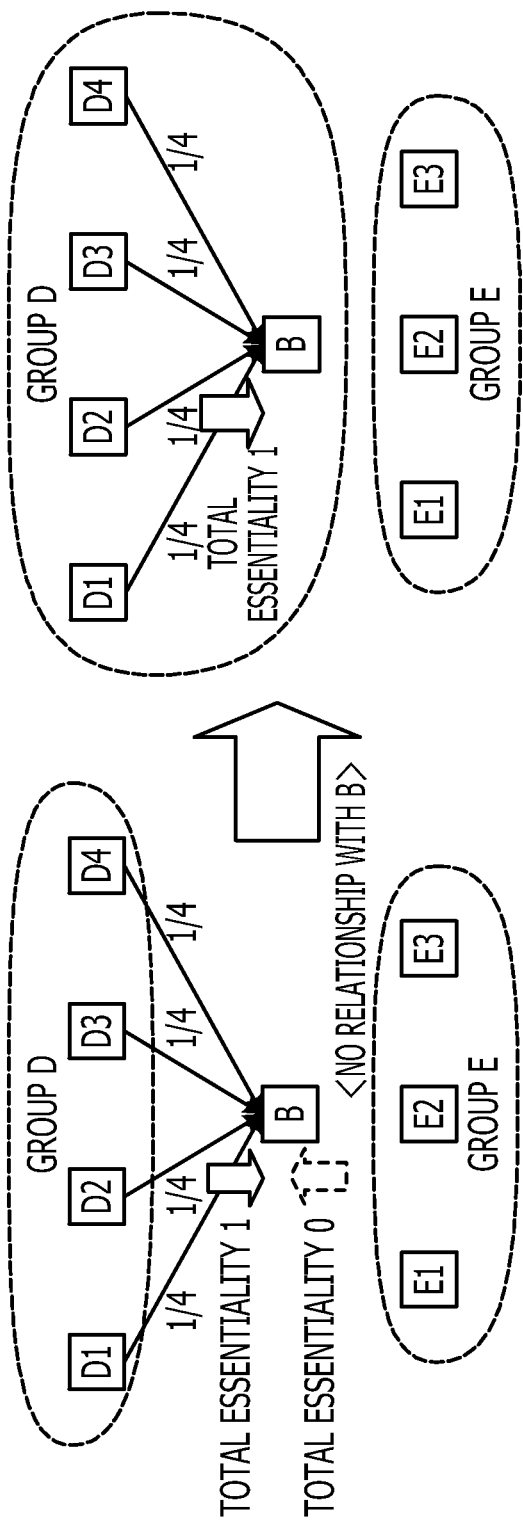
FIG. 2C

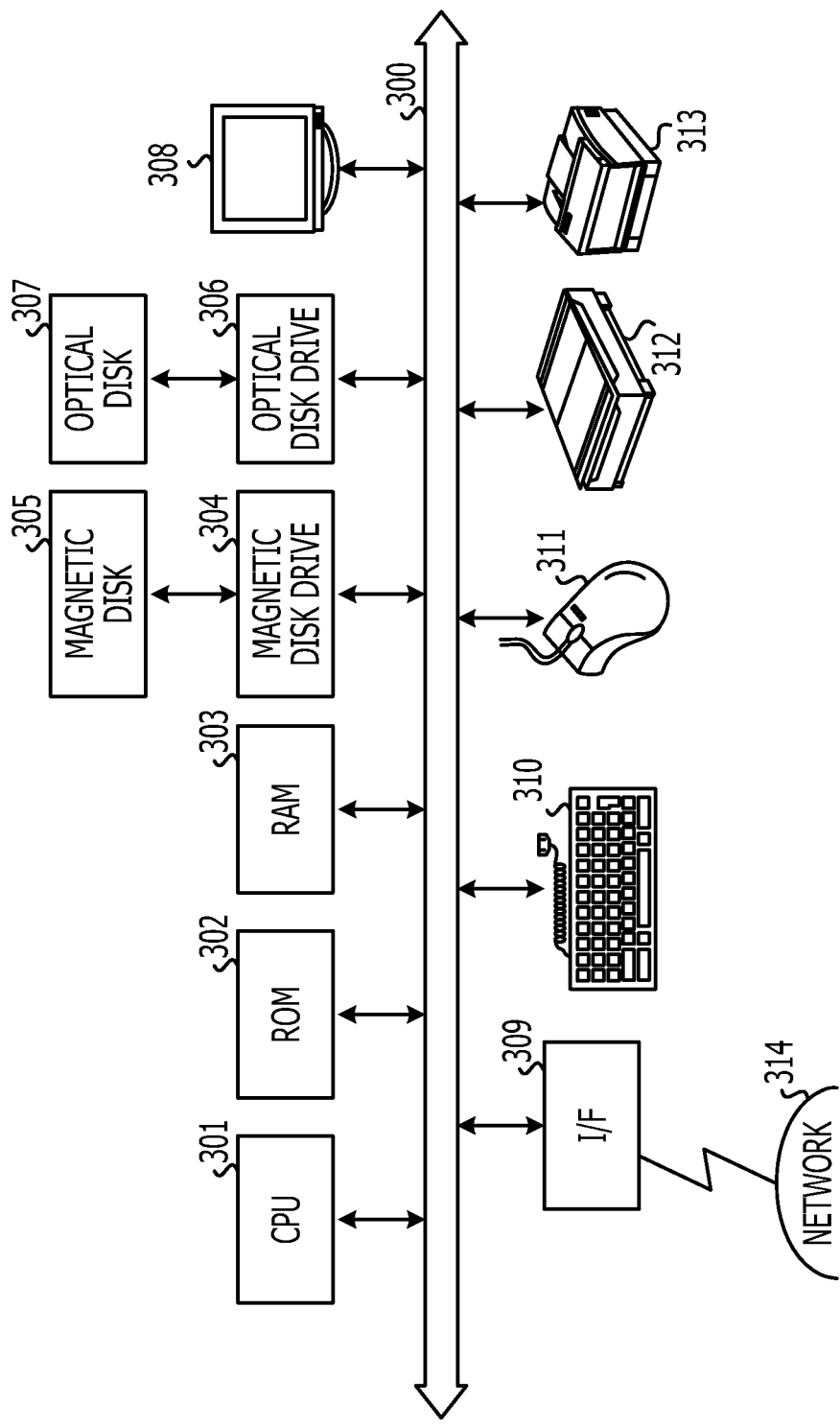

FIG. 7

| ORIGINATING ENTITY | RECEIVING ENTITY |
|---|---|
| 2 | 1 |
| 2 | 5 |
| 2 | 9 |
| 2 | 14 |
| 3 | 1 |
| 4 | 1 |
| 4 | 3 |
| 5 | 1 |
| 6 | 1 |
| 6 | 5 |
| 6 | 14 |
| 7 | 1 |
| 7 | 3 |
| 7 | 9 |
| 7 | 10 |
| 8 | 1 |
| 8 | 3 |
| 8 | 4 |
| 8 | 5 |
| 8 | 12 |
| 9 | 1 |
| 10 | 1 |
| 10 | 3 |
| 10 | 9 |
| 11 | 1 |
| 11 | 3 |
| 11 | 5 |
| 12 | 1 |
| 12 | 3 |
| 12 | 9 |
| 13 | 1 |
| 13 | 3 |
| 13 | 4 |
| 13 | 12 |
| 14 | 1 |
| 14 | 5 |
| 14 | 6 |
| 14 | 11 |
| 15 | 1 |
| 15 | 5 |
| 15 | 9 |
| 15 | 10 |
| 16 | 11 |
| 16 | 9 |
| 16 | 10 |

| ORIGINATING ENTITY | RECEIVING ENTITY |
|---|---|
| 2 | 1 |
| 2 | 5 |
| 2 | 9 |
| 2 | 14 |
| 3 | 1 |
| 4 | 1 |
| 4 | 3 |
| 5 | 1 |
| 6 | 1 |
| 6 | 5 |
| 6 | 14 |
| 7 | 1 |
| 7 | 3 |
| 7 | 9 |
| 7 | 10 |
| 8 | 1 |
| 8 | 3 |
| 8 | 4 |
| 8 | 5 |
| 8 | 12 |
| 9 | 1 |
| 10 | 1 |
| 10 | 3 |
| 10 | 9 |
| 11 | 1 |
| 11 | 3 |
| 11 | 5 |
| 12 | 1 |
| 12 | 3 |
| 12 | 9 |
| 13 | 1 |
| 13 | 3 |
| 13 | 4 |
| 13 | 12 |
| 14 | 1 |
| 14 | 5 |
| 14 | 6 |
| 14 | 11 |
| 15 | 1 |
| 15 | 5 |
| 15 | 9 |
| 15 | 10 |
| 16 | 11 |
| 16 | 9 |
| 16 | 10 |

410

| ESSENTIALITY |
|---|
| 1/15 |
| 1/6 |
| 1/6 |
| 1/2 |
| 1/15 |
| 1/15 |
| 1/7 |
| 1/15 |
| 1/15 |
| 1/6 |
| 1/2 |
| 1/15 |
| 1/7 |
| 1/6 |
| 1/3 |
| 1/15 |
| 1/7 |
| 1/2 |
| 1/6 |
| 1/2 |
| 1/15 |
| 1/15 |
| 1/7 |
| 1/6 |
| 1/15 |
| 1/7 |
| 1/6 |
| 1/15 |
| 1/7 |
| 1/6 |
| 1/15 |
| 1/7 |
| 1/2 |
| 1/2 |
| 1/15 |
| 1/6 |
| 1/1 |
| 1/1 |
| 1/15 |
| 1/6 |
| 1/6 |
| 1/3 |
| 1/15 |
| 1/6 |
| 1/3 |

| $A_{ij}$ | \ | | | | | | RECEIVER j | | | | | | | | | |
|---|---|---|---|---|---|---|---|---|---|---|---|---|---|---|---|---|
| ORIGINATOR i | 1 | 2 | 3 | 4 | 5 | 6 | 7 | 8 | 9 | 10 | 11 | 12 | 13 | 14 | 15 | 16 |
| 1 | 0 | 0 | 0 | 0 | 0 | 0 | 0 | 0 | 0 | 0 | 0 | 0 | 0 | 0 | 0 | 0 |
| 2 | 1/15 | 0 | 0 | 0 | 1/6 | 0 | 0 | 0 | 1/6 | 0 | 0 | 0 | 0 | 1/2 | 0 | 0 |
| 3 | 1/15 | 0 | 0 | 0 | 0 | 0 | 0 | 0 | 0 | 0 | 0 | 0 | 0 | 0 | 0 | 0 |
| 4 | 1/15 | 0 | 1/7 | 0 | 0 | 0 | 0 | 0 | 0 | 0 | 0 | 0 | 0 | 0 | 0 | 0 |
| 5 | 1/15 | 0 | 0 | 0 | 0 | 0 | 0 | 0 | 0 | 0 | 0 | 0 | 0 | 0 | 0 | 0 |
| 6 | 1/15 | 0 | 0 | 0 | 1/6 | 0 | 0 | 0 | 1/6 | 0 | 0 | 0 | 0 | 1/2 | 0 | 0 |
| 7 | 1/15 | 0 | 1/7 | 0 | 0 | 0 | 0 | 0 | 0 | 0 | 0 | 0 | 0 | 0 | 0 | 0 |
| 8 | 1/15 | 0 | 1/7 | 1/2 | 0 | 0 | 0 | 0 | 0 | 1/3 | 0 | 0 | 0 | 0 | 0 | 0 |
| 9 | 1/15 | 0 | 0 | 0 | 0 | 0 | 0 | 0 | 0 | 0 | 0 | 0 | 0 | 0 | 0 | 0 |
| 10 | 1/15 | 0 | 1/7 | 0 | 1/6 | 0 | 0 | 0 | 1/6 | 0 | 0 | 0 | 0 | 0 | 0 | 0 |
| 11 | 1/15 | 0 | 1/7 | 0 | 0 | 0 | 0 | 0 | 0 | 0 | 0 | 0 | 0 | 0 | 0 | 0 |
| 12 | 1/15 | 0 | 1/7 | 1/2 | 1/6 | 0 | 0 | 0 | 0 | 0 | 0 | 0 | 0 | 0 | 0 | 0 |
| 13 | 1/15 | 0 | 0 | 0 | 0 | 0 | 0 | 0 | 1/6 | 0 | 1/1 | 0 | 0 | 0 | 0 | 0 |
| 14 | 1/15 | 0 | 0 | 0 | 1/6 | 1/1 | 0 | 0 | 0 | 0 | 0 | 1/2 | 0 | 0 | 0 | 0 |
| 15 | 1/15 | 0 | 0 | 0 | 1/6 | 0 | 0 | 0 | 1/6 | 1/3 | 0 | 0 | 0 | 0 | 0 | 0 |
| 16 | 1/15 | 0 | 0 | 0 | 0 | 0 | 0 | 0 | 1/6 | 1/3 | 0 | 0 | 0 | 0 | 0 | 0 |

FIG. 11

| VERTEX | $k^{IN}$ | $k^{OUT}$ |
|---|---|---|
| 1 | 1 | 0 |
| 2 | 0 | 0.9 |
| 3 | 1 | 0.067 |
| 4 | 1 | 0.21 |
| 5 | 1 | 0.067 |
| 6 | 1 | 0.733 |
| 7 | 0 | 0.71 |
| 8 | 0 | 1.376 |
| 9 | 1 | 0.067 |
| 10 | 1 | 0.376 |
| 11 | 1 | 0.376 |
| 12 | 1 | 0.376 |
| 13 | 0 | 1.21 |
| 14 | 1 | 2.233 |
| 15 | 0 | 0.733 |
| 16 | 0 | 0.567 |

| ORIGINATING METHOD | RECEIVING METHOD |
|:---:|:---:|
| A.a | B.c |
| A.b | B.e |
| C.f | B.c |
| C.f | B.d |
| C.g | B.e |

FIG. 35

| CLUSTER | ORDER | WORD | FEATURE AMOUNT |
|---|---|---|---|
| 1 | 1 | RESOURCE | 43 |
| 1 | 2 | STREAM | 27 |
| 1 | 3 | ZIP | 18 |
| 2 | 1 | REGEXP | 30 |
| 2 | 2 | SCANNER | 21 |
| 2 | 3 | FILTER | 8 |
| 3 | 1 | ISSUE | 23 |

DIVIDING DEVICE, DIVIDING METHOD, AND RECORDING MEDIUM

CROSS-REFERENCE TO RELATED APPLICATION(S)

This application is based upon and claims the benefit of priority of the prior Japanese Patent Application No. 2012-7568, filed on Jan. 17, 2012, the entire contents of which are incorporated herein by reference.

FIELD

The embodiments discussed herein are related to a dividing device, a dividing method, and a recording medium.

BACKGROUND

It is desirable to have an understanding of software for software development, improvement, and maintenance. For this reason, it is desirable to divide software into small scale subsets that are easily understood. Software division is discussed in detail. Furthermore, the elements that structure software are termed as "entities." For example, components, modules, source code, classes, functions, databases, files, and the like correspond to entities.

Also, relationships such as call relationships, inheritance relationships, inclusive relationships, data access relationships, and the like are termed as "dependent relationships" between entities. Entities in the software may be expressed with directed graph configurations (hereafter, abbreviated to "graph") as vertices, using relationships between entities as directed edges (hereafter, abbreviated to "edges"). Software division is the division of graphs into subgraphs. Subgraphs include sets of entities.

There has been many proposals of software division technologies of the related art for uses other than the understanding of software. For example, Japanese Laid-open Patent Publication No. 2003-308216, which is an example of related art, discusses a technology to divide software into small structural elements and load only those elements desired in order to decrease the amount of memory usage of software loaded into memory space.

Also, there are proposals of technologies that perform automatic software division to reduce the work of creating desired information for division. For example, Japanese Laid-open Patent Publication No. 2009-134379, which is an example of related art, discusses a technology to divide software into multiple groups in order to decrease the amount of memory usage of software loaded into memory space, in regards to software that operates by combinations of multiple software modules. Japanese Laid-open Patent Publication No. 2009-134379 discuses representing a strength of dependent relationships between modules as the number of call points, and performing automatic division by dividing software to suppress this strength. In other words, the automatic division of Japanese Laid-open Patent Publication No. 2009-134379 streamlines the loading of software into memory by not dividing and aggregating modules that have a high frequency of call relationships.

Also, the general problem with software division is the inability to apply automatic division methods correlated with some specific purpose to a different purpose, as the desired type of division changes depending on the purpose of the division. Accordingly, methods are discussed that allow an individual to edit a division process and adapt it to their purposes, as the desired division changes depending on the purpose of analysis. For example, "Software Architecture Reconstruction: A Process-Oriented Taxonomy" by S. Ducasse and D. Pollet, IEEE Transactions on Software Engineering, vol. 35, no. 4, pp. 573-591, 2009 is an example of this kind of related art. Also, "Supporting Migration to Services using Software Architecture Reconstruction" by L. O'Brien, D. Smith, and G. Lewis, 13th IEEE International Workshop on Software Technology and Engineering Practice (Step '05), pp. 81-91, 2005 is another example of this kind of related art.

Also, as an aid to the understanding of software, it is desired that the software division is applicable to the work, functions, and tasks that express the software. Here, these functions, tasks, and work are referred to as "roles." Software design takes place by extracting, organizing, and compartmentalizing the roles to be fulfilled by the software. As the understanding of software is the reverse progression of this design process, extracting and analyzing the roles is a key to the understanding of software.

The following conditions (1) and (2) are used to determine if a subset of a divided entity follows a role. (1) The inter-entity dependent relationship and an important entity which functions as the main purpose that represents the role implied by the subset are both included in this subset. (2) The inter-entity dependent relationship and trivial detail entity which hinders understanding of the main purpose of the software are disregarded when this subset forms.

An example technology to remove the "inter-entity dependent relationship and trivial detail entity which hinders understanding of the main purpose of the software" as described above is discussed in non-patent literature below. For example, "Summarizing the Content of Large Traces to Facilitate the Understanding of the Behavior of a Software System" by A. Hamou-Lhadj and T. Lethbridge, 14th International Conference on Program Comprehension (ICPC '06), pp. 181-190, 2006, which is an example of related art, refers to ubiquitous functions in software such as log processing and exception processing as "utilities", and reduces noise interfering with the understanding by removing call relationships of utilities.

SUMMARY

According to an aspect of the invention, a dividing device includes: a memory configured to store a program including a procedure; and a processor configured to execute the program, the procedure including: extracting correlation information from source code of software, the information correlating relationships between an originating entity of the relationship and a receiving entity of the relationship, which are identified by dependent relationships of a group of entities, which is the group of elements that structure the software, and dividing the group of entities into clusters, so as to be include in the cluster a lot of the dependent relationship which a weight related to the dependent relationships is large, based on the weight related to the dependent relationships identified by the correlation information extracted by the extracting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A, FIG. 2B, and FIG. 2C are example explanatory diagrams illustrating dependent relationships.

FIG. 3 is a block diagram illustrating an example hardware configuration of a dividing device as related to a First Embodiment.

FIG. 7 is an explanatory diagram illustrating an example of relationship graph information related to the software depicted in FIG. 5.

FIG. 8 is an explanatory diagram illustrating an example of essentiality information.

FIG. 10 is an explanatory diagram illustrating an adjacency matrix using the relationship graph information depicted in FIG. 7 and the essentiality information shown in FIG. 8.

FIG. 11 is an explanatory diagram illustrating a parameter table linking $k_j^{IN}$ and $k_i^{OUT}$ for each entity using the relationship graph information depicted in FIG. 7 and the essentiality information depicted in FIG. 8.

FIG. 35 is an example explanatory diagram of a keyword list.

DESCRIPTION OF EMBODIMENTS

The related art assumes that all information desired for division is supplied. That is to say, it is desirable to clearly define information related to the software to be divided. When the purpose is to understand software, and information related to software is not clearly defined, this information related to software is created, which causes a problem when the amount of work becomes large depending on the scale of the software.

Also, regarding the related art, general processing with a high usage frequency such as log processing and exception processing may be called from anywhere in the software. For this reason, general processing with a high usage frequency are not divided and instead grouped together. However, the main purpose of software may be understood without general processing with a high usage frequency, and actually this creates a problem causing noise interference with the understanding. For this reason, it is desirable not to include general processing with a high usage frequency into the same group.

Also, regarding the related art, the editing from a person may cause a problem when this creates a large amount of work depending on the scale of that which is to be analyzed. Also, regarding the related art, it is difficult to clearly determine which functions in the software may be ignored, which may cause problems whereby calls that significantly help in the understanding are mistakenly deleted.

The details of embodiments for a dividing device, a dividing method, and a dividing program related to this technology are described below while referencing the attached drawings.

With regards to the present technology, the dividing device, the dividing method, and the dividing program handles sets of entities, which are structural elements of software, and so by dividing these into subsets that enable easy understanding of the software, the structure of the software is clearly defined. This enables an instinctive and easy understanding, and also enables software to be managed in appropriate units. The present technology uses software analysis and reverse engineering technologies.

One aspect of the present technology improves the level of precision for the division of software.

First Embodiment

Figure 1:
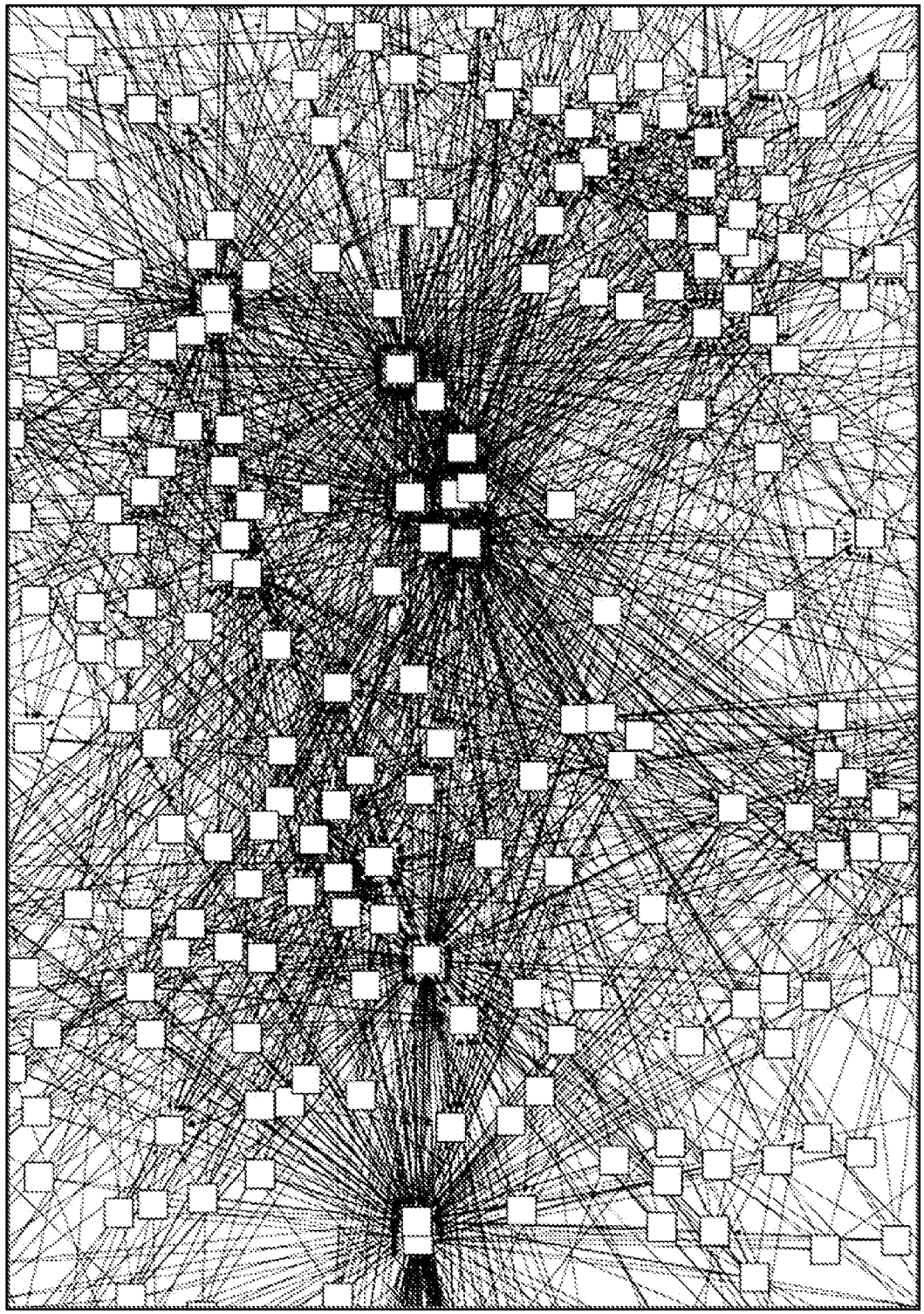
FIG. 1 is an example explanatory diagram illustrating software that has been graphed.

FIG. 1 is an example explanatory diagram illustrating software that has been graphed. The blocks in FIG. 1 represent entities, which are structural elements of software. Also, arrows between entities represent dependent relationships. The beginning of arrows represents an originating entity of the relationship, and the end of arrows (head of the arrow) represents a receiving entity of the relationship. For example, when the dependent relationship represents a call relationship, the originating entity of the relationship is calling the receiving entity of the relationship.

The dividing device, the dividing method, and the dividing program according to the First Embodiment have the following qualities (1) through (3). (1) Software division is executed for software that is a set of entities, by giving emphasis to entities and dependent relationships that form the main purpose of the software processing, and grouping these entities together. (2) Software division is executed so that entities and dependent relationships that hinder understanding, such as those for utilities are disregarded, and are removed from the divided group when desirable. (3) Software division is executed, however, so that entities that may be disregarded initially be included in the relevant group if these entities add features to the divided group.

In this way, the dividing device, the dividing method, and the dividing program according to the First Embodiment allow the division of software, which is a set of entities as depicted in FIG. 1, into subsets that are easy to understand. Furthermore, software is expressed with graphs, and when the appropriate graph is divided into a subgraph, the subgraph or the set of entities depicted in the subgraph is referred to as a group or a cluster. Dividing the graph into a cluster is referred to as clustering.

Example of Dependent Relationships

FIG. 2A, FIG. 2B, and FIG. 2C are example explanatory diagrams illustrating dependent relationships. Regarding the inter-entity dependent relationships, the degree to which a particular dependent relationship is essential for the originating entity of the relationship to fulfill its role is referred to as "essentiality." Essentiality is given to each dependent relationship, and is used as a weight for the edge regarding the dependent relationship. Essentiality is expressed in the present example with the following Expression (1).

$$E(A, B) = \frac{1}{d_{in}(B)} \quad (1)$$

Regarding the Expression (1) above, the left-hand side E (A, B) represents the essentiality of the dependent relationship from entity A to entity B. The right-hand side denominator $d_{in}(B)$ represents the indegree of entity B (B is the receiving entity of the relationship as expressed by an edge number, or the dependent relationship number). According to the present embodiment, this Expression (1) may be used for the right-hand side, but another form may also be used, for example, to determine the relative size of entity B, or a significance value previously attributed.

FIG. 2A illustrates an example of essentiality. Regarding entity A1 and A2, entity A1 is the receiving entity of the relationship, and entity A2 is the originating entity of the relationship. Entity A1 is dependent only with entity A2, and so from the perspective of entity A2, the dependent relationship with entity A1 has a high value of essentiality. The reason for this is that in order for entity A2 to fulfill its role, the possibility that entity A1 has been created is high, and this is interpreted to mean that entity A1 is essential for entity A2. Specifically, the number of edges in this example is 1 (indegree=1), and so the essentiality representing the degree to which the dependent relationship with entity A2 is essential for entity A1 is also 1.

FIG. 2B illustrates an example of essentiality when there are multiple originating entities of the relationship. Entities D1 through D4 are originating entities of the relationships, and entity B is the common receiving entity of the relationships with entities D1 though D4. In this case, from the perspective of entity D1, the essentiality of the dependent relationship with entity B is low. The reason for this is that in order for entity D1 to fulfill its role, the possibility that entity B has been created is low, and it is therefore difficult to say that entity B is essential to entity D1. This applies to entities D2 through D4 as well. Specifically, the number of edges representing entity B as the originating entity of the relationships in this example is 4 (indegree=4), and so the essentiality representing the degree to which the dependent relationship with entity B is essential for each of the entities D1 through D4 is ¼.

FIG. 2C illustrates whether entity B is included in Group D to which entities D1 through D4 belong in the case in FIG. 2B. The essentiality of ¼ from entity D1 to entity B is low, however for Group D, which consists of entities D1 through D4, the is combined to give a total group essentiality of 1 to entity B, which is a high value. In contrast, the essentiality for each entity of entities E1 through E3, which form Group E, to entity B is 0, and therefore the total essentiality from Group E to entity B is also 0. In this case, it would be preferable to include entity B in Group D as opposed to Group E, and this would meet the requirement of quality (3) described above.

Example Hardware Configuration of Dividing Device

FIG. 3 is a block diagram of an example hardware configuration for a dividing device as related to the First Embodiment. Regarding FIG. 3, the dividing device includes a CPU (Central Processing Unit) 301, a ROM (Read Only Memory) 302, a RAM (Random Access Memory) 303, a magnetic disk drive 304, a magnetic disk 305, an optical disc drive 306, an optical disc 307, a display 308, an I/F (Interface) 309, a keyboard 310, a mouse 311, a scanner 312, and a printer 313. Also, each component unit is connected via a bus 300.

Here, the CPU 301 controls the dividing device entirely. The ROM 302 stores a boot program and other similar programs. The RAM 303 is used as a workspace for the CPU 301. The magnetic disk drive 304 controls reading and writing of data from/to the magnetic disk 305, following CPU 301 control. The magnetic disk 305 stores the data written to it via magnetic disk drive 304 control.

The optical disc drive 306 controls the reading and writing of data to/from the optical disc 307, following CPU 301 control. The optical disc 307 stores the data written to it via optical disc drive 306 control, and data stored in the optical disc 307 is read by a computer.

The display 308 displays a cursor, icons, and tool boxes, as well as text, images, function information, and other such data. This display 308 may consist of an LCD display or a plasma display, for example.

The interface (hereafter, I/F) 309 is connected to a network 314 such as a LAN (Local Area Network), a WAN (Wide Area Network), the Internet, or some other network through a communication line, and so is also connected to other devices through this network 314. Also, the I/F 309 controls the interface between the network 314 and internal components, and also controls the input and output of data from external devices. The I/F 309 may, for example, consist of a modem, a LAN adapter, or the like.

The keyboard 310 includes keys for the input of letters, numbers, and other various instructions, and so performs data input. Also, this may be a touch panel input pad or numerical keypad. The mouse 311 performs cursor movement and section selection, and also performs window movement, changes in window size, and other similar functions. A trackball, joystick, or similar may also be used as the pointing device, if it has the same type of functionality as the mouse.

The scanner 312 optically reads images, and handles image data in the dividing device. Furthermore, the scanner 312 may also have an OCR (Optical Character Reader) function. Also, the printer 313 prints image data and text data. The printer 313 may consist, for example, of a laser printer or ink-jet printer. Furthermore, at least one of any of the optical disc drive 306, the optical disc 307, the display 308, the keyboard 310, the mouse 311, the scanner 312, and the printer 313 may be omitted.

Example Functional Configuration of Dividing Device

Figure 4:
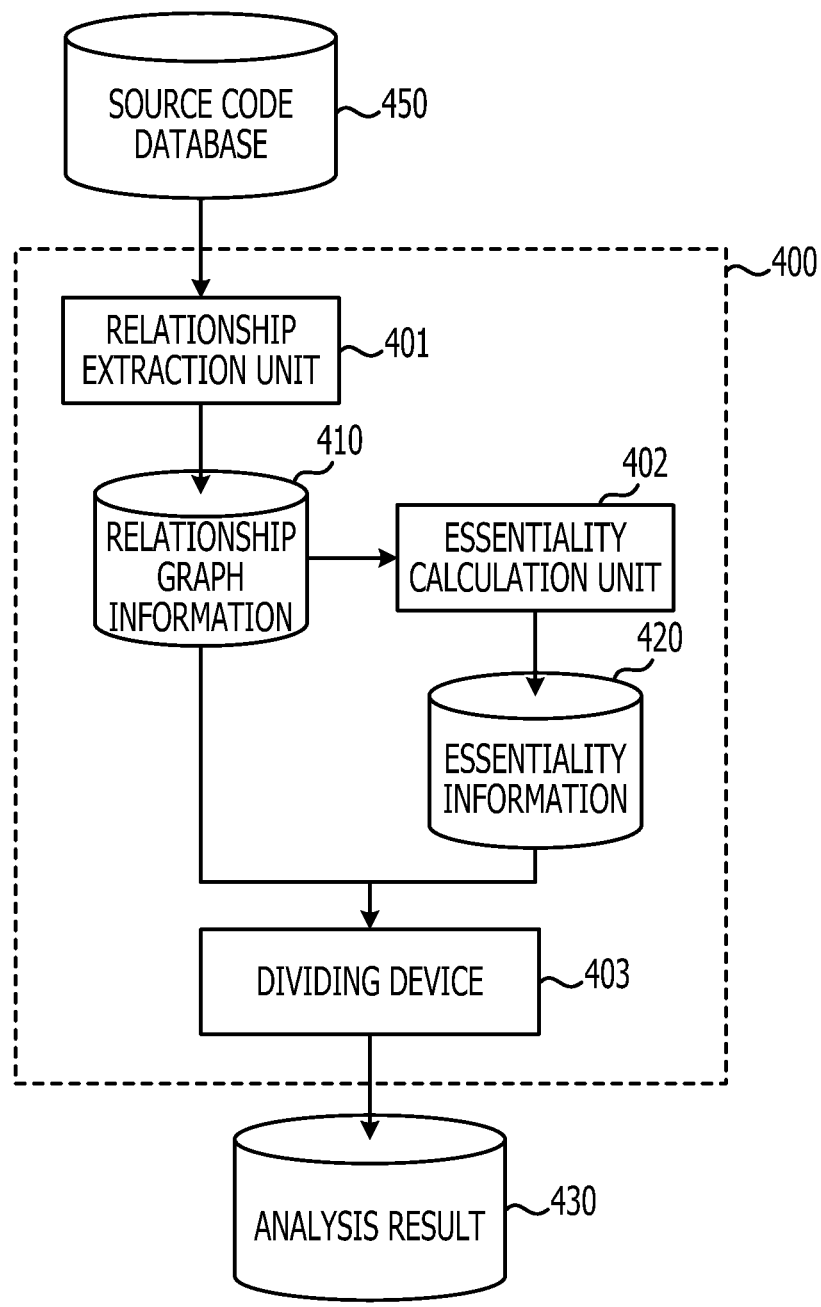
FIG. 4 is a block diagram illustrating an example of a functional configuration of a dividing device according to the First Embodiment.

FIG. 4 is a block diagram illustrating an example functional configuration of the dividing device according to the First Embodiment. A dividing device 400 includes a relationship extraction unit 401, an essentiality calculation unit 402, and a dividing unit 403. More specifically, the relationship extraction unit 401, the essentiality calculation unit 402, and the dividing unit 403 are functions that exist as programs stored on a storage medium such as the ROM 302, the RAM 303, the magnetic disk 305, the optical disc 307, or similar as depicted in FIG. 3, which are executed by the CPU 301 or through the I/F 309.

The relationship extraction unit 401 extracts the inter-entity dependent relationships in the software. Specifically, the relationship extraction unit 401 reads the software source code from a source code database 450, and analyzes the source code by currently existing syntax analysis technologies or static analysis technologies. The source code database 450 stores the software source code. The source code database 450 includes a storage device.

Figure 5:
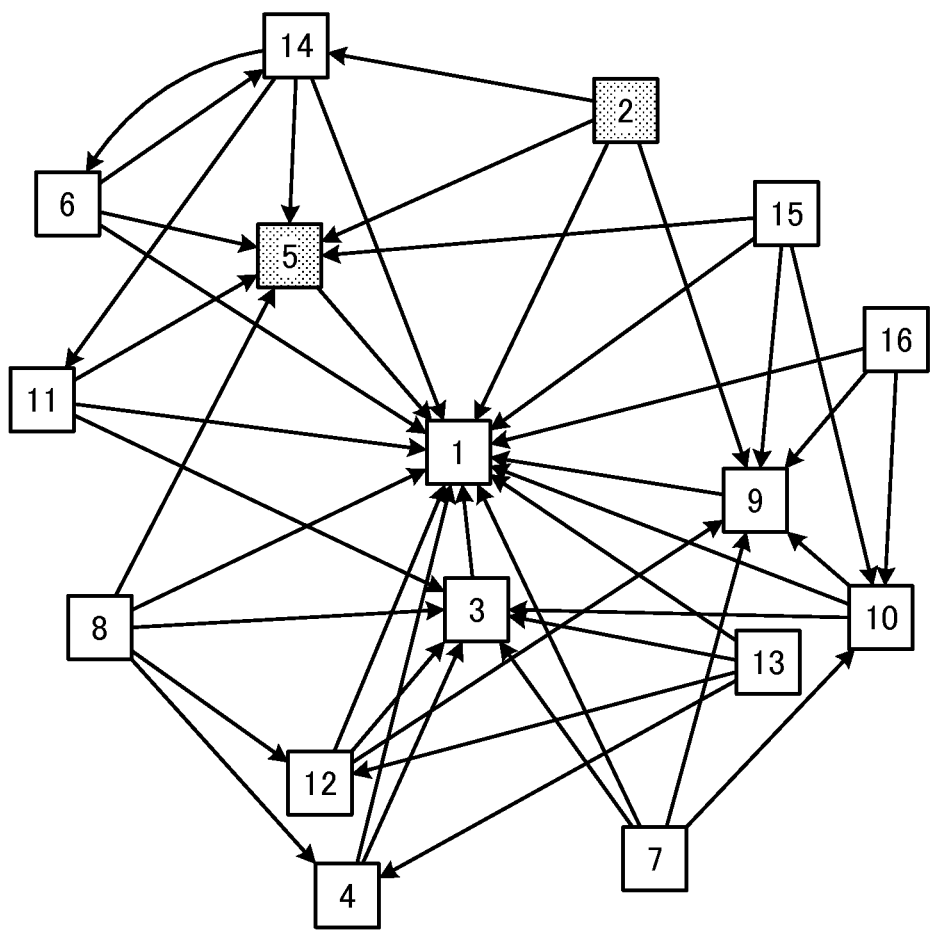
FIG. 5 is an explanatory diagram illustrating an example graph representation of software.

FIG. 5 is an explanatory diagram illustrating an example graph expression of software. For the sake of clarity, the number of entries in the software depicted in FIG. 5 is 16. Each entity may represent, for example, a JAVA (registered trademark) language class, and the entity number corresponds with the class number in FIG. 6. For example, Entity # (# is some number) corresponds to class C#.

Figure 6A:
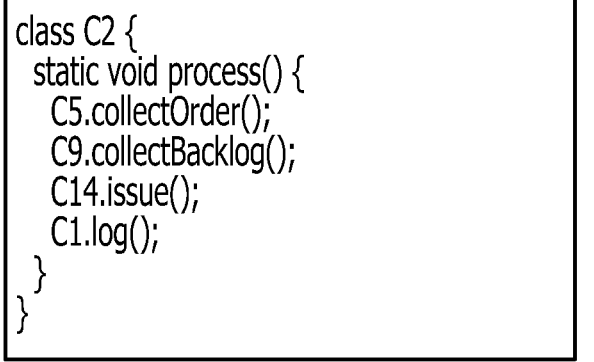
FIG. 6A and FIG. 6B are explanatory diagrams illustrating example source code of the software depicted in FIG. 5.
Figure 6B:
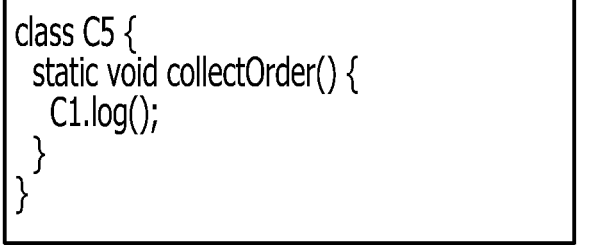

FIG. 6A and FIG. 6B are explanatory diagrams illustrating example source code of the software depicted in FIG. 5. FIG. 6A and FIG. 6B give descriptions using JAVA language source code as the example. FIG. 6A illustrates that class C2 is source code that calls class C5, C9, C14, and C1.

Returning to FIG. 4, the relationship extraction unit 401 extracts entities from the analyzed source code. For example, the relationship extraction unit 401 extracts class C2 as the originating entity of the relationship from the source code depicted in FIG. 6A. Also, the relationship extraction unit 401 extracts class C5, C9, C14, and C1, which are the call destinations from class C2, as the receiving entities of the relationship of class C2, from the source code 601 depicted in FIG. 6A. In this way, the dependent relationships of the originating entity of the relationship are extracted. Similarly, the relationship extraction unit 401 extracts class C5 as the originating entity of the relationship from source code 602 depicted in FIG. 6B, and extracts class C1 as the receiving entity of the relationship.

The relationship extraction unit 401 groups the extracted originating entity of the relationship and the receiving entities of the relationship, and stores this as a relationship graph information 410 record. Using FIG. 6A for example, the relationship extraction unit 401 stores {2, 5}, {2, 9}, {2, 14}, and {2, 1} in the relationship graph information 410. The format {a, b} represents the grouping whereby "a" is the number of the originating entity of the relationship, and "b" is the number of the receiving entity of the relationship. In this way, the relationship graph information 410 is generated.

FIG. 7 is an example explanatory diagram illustrating the relationship graph information 410 related to the software depicted in FIG. 5. The relationship graph information 410 is a table that lists the relationship between the originating entity of the relationship and the receiving entity of the relationship. The relationship graph information 401 is stored in a storage device.

The essentiality calculation unit 402 calculates the essentiality from the originating entity of the relationship to the receiving entity of the relationship. Specifically, the essentiality calculating unit 402 may calculate, for example, by using the Expression (1) described above.

FIG. 8 is an example explanatory diagram of an essentiality information 420. In FIG. 8, the relationship graph information 410 from FIG. 7 is also displayed to illustrate the corresponding relationship with the relationship graph information 410. Regarding the essentiality information 420, as an example, essentiality is expressed as an inverse number to the indegree number of the receiving entity of the relationship. In the first row of the example, the originating entity of the relationship of the relationship graph information 410 is C2, and the receiving entity of the relationship is C1. The number of edges, or the indegree number of the receiving entity of the relationship C1, is 15, which in this case means an essentiality of $1/15$. Furthermore, a pointer is used in FIG. 8 in each row of the relationship graph information 410 indicate the relationship, which allows the essentiality information 420 to be saved as a different table from the relationship graph information 410.

The dividing unit 403 clusters the software using the essentiality. The dividing unit 403 executes clustering that divides the software graph into subgraphs using the essentiality, and outputs the result of the software division as an analysis result 430. Also, the dividing unit 403 performs the clustering such that the total essentiality of edges in the cluster is larger than the expected value (or the total essentiality of edges not included in the subgraph is smaller), which is done to ensure that the qualities (1) through (3) described above are satisfied. If the qualities (1) through (3) are satisfied, entities that give features to the cluster (i.e. the total essentiality for this cluster is high) are included in the cluster.

The clustering algorithm used by the dividing unit 403 to satisfy the qualities (1) through (3) is an extended form of the technology described below.

(Reference literature) M. E. J. Newman (2004). "Fast algorithm for detecting community structure in networks". Physical Review E 69 (6): 066133.

The reference literature above is literature that proposes an algorithm that is called "Newman's clustering algorithm" or the "modularity maximization algorithm." This algorithm uses a modularity assessment function (also known as modularity) as a criterion that illustrates the quality of the graph clustering, and searches for the clustering (division into clusters) that has the largest modularity assessment function value by way of a greedy algorithm.

However, since the algorithm described above is applicable to graphs whose modularity assessment function has "no weight" or are "non-directed", the algorithm may not be used in the present embodiment without modification. According to the present embodiment, an extended modularity assessment function $Q_{DW}$ has been developed to allow the use of graphs that "have weight" and are "directed", and is defined in Expression (2) below.

$$Q_{DW} = \frac{1}{m} \sum_{i,j} \left[ A_{ij} - \frac{k_i^{OUT} k_j^{IN}}{m} \right] \delta(c_i, c_j) \qquad (2)$$

Regarding the Expression (2) above, $A_{ij}$ is an element of an adjacency matrix A of the graph. The index i represents the vertex number of the originating entity of the relationship, and the index j represents the vertex number of the receiving entity of the relationship. The value of the element of the adjacency matrix A is weighting of edges, and is non-negative. When the value is greater than zero, this means there are edges, and when the value is zero, this means there are no edges. As this is a directed graph, the adjacency matrix A is an asymmetrical matrix.

Also, $k_i^{OUT}$ is the total weight of the edge in which the vertex i becomes the originating entity of the relationship. This is specifically expressed in the following Expression (3).

$$k^{OUT}_i = \Sigma_j A_{ij} \qquad (3)$$

Also, $k_j^{IN}$ is the total weight of the edge in which the vertex j becomes the receiving entity of the relationship. This is specifically expressed in the following Expression (4)

$$k_j^{IN} = \Sigma_i A_{ij} \qquad (4)$$

Also, m is the total weight of the edge (element $A_{ij}$), and is the sum of the element $A_{ij}$ of the adjacency matrix A. This is specifically expressed in the following Expression (5).

$$m = \Sigma_i \Sigma_j A_{ij} \qquad (5)$$

Also, $c_i$ represents the cluster to which vertex i belongs. All vertices belong to some cluster.

$\delta(c_i, c_j)$ is the Kronecker delta function. This means that if cluster $c_i$ and cluster $c_j$ are the same, then $\delta(c_i, c_j)=1$, otherwise $\delta(c_i, c_j)=0$.

The range of the modularity assessment function $Q_{DW}$ is [-1, 1], and a larger number means a good clustering, and a smaller number means a bad clustering. However, actual maximum values and minimum values are dependent on the graph, and actual maximum values rarely approach the value of one.

Expression (2) described above is described here. Kronecker's delta function $\delta(c_i, c_j)$ serves to only consider edges in the cluster and to ignore edges outside the cluster. Kronecker's delta function $\delta(c_i, c_j)$ is the expression used for edges in each cluster. In other words, when cluster $c_i$ and cluster $c_j$ are different, $\delta(c_i, c_j)=0$, and so a zero is contributed to the modularity assessment function $Q_{DW}$.

The adjacency matrix $A_{ij}$ is the weight of the edge between vertex i and vertex j. The expected value of the weighted ratio for the edge leaving from vertex i is represented as $k_i^{OUT}/m$, and the expected value of the weighted ratio for the edge entering vertex j is represented as $k_j^{IN}/m$, and so the expected value for the weight of the edge from the Entity i to the Entity j is expressed in the following Expression (6).

$$m \cdot (k_i^{OUT}/m) \cdot (k_j^{IN}/m) = k_i^{OUT} \cdot k_j^{IN}/m \qquad (6)$$

The right-hand side of Expression (6) described above is a part of Expression (2). That is to say, the modularity assessment function $Q_{DW}$ of Expression (2) is the total essentiality of edges belonging to each cluster and the difference between this and the expected value, in which the total for each cluster is normalized so that the values fit in the range of [1, -1].

To express this in more intuitive terms, the modularity assessment function $Q_{DW}$ becomes larger when the sum of essentiality of edges in the cluster is larger than the expected value. Put another way, it becomes larger when the essentiality of edges in the cluster have a high density, or it becomes larger when the total essentiality of edges outside the cluster is small.

Figure 9:
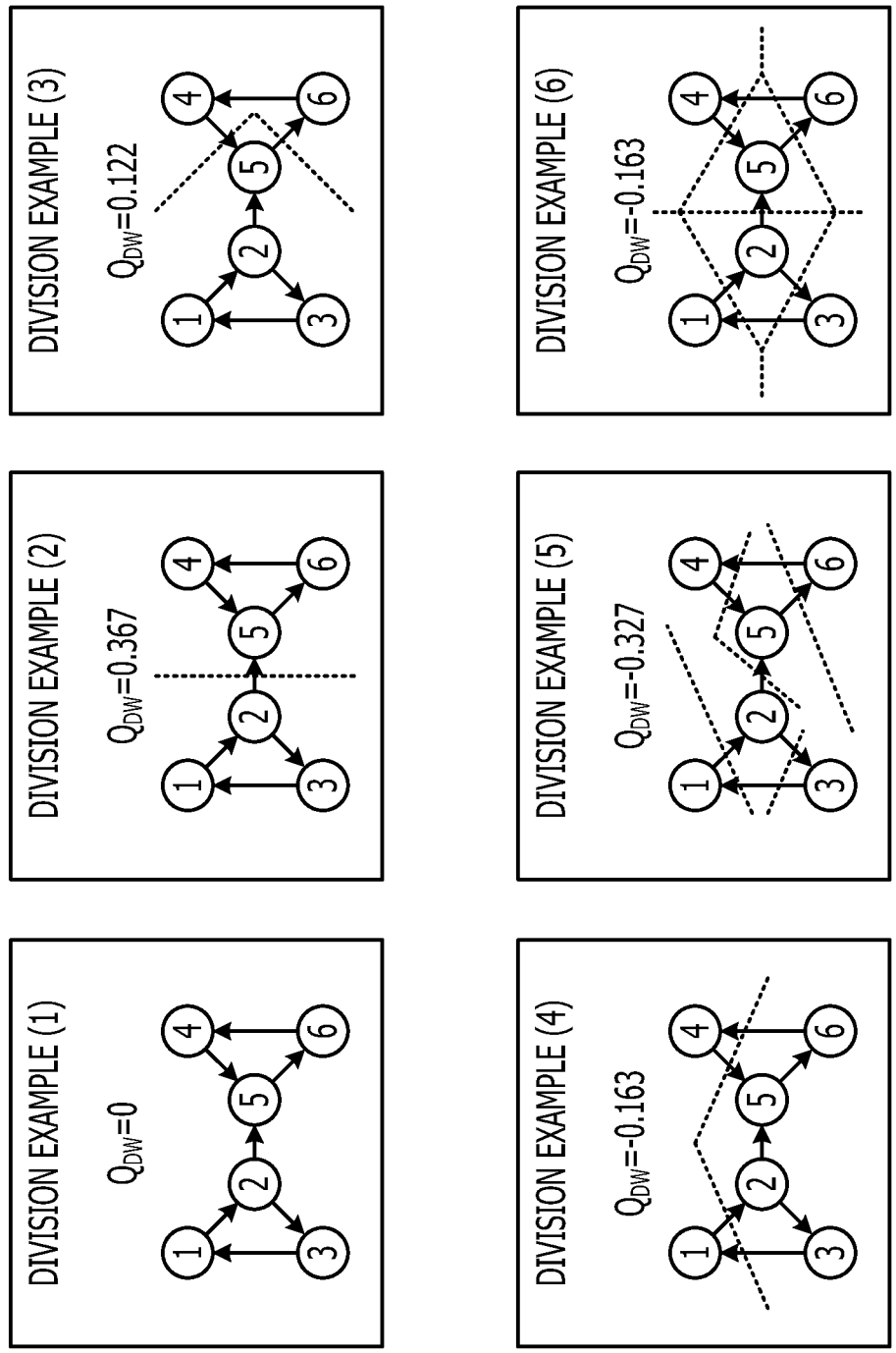
FIG. 9 is an explanatory diagram illustrating an example division of a certain directed graph.

FIG. 9 is an explanatory diagram illustrating an example division of a directed graph. Here, a directed graph with 6 vertices is used in FIG. 9 to simplify the discussion. Furthermore, the weight of all edges is set to "1" to facilitate discussion. Division example (1) depicts the case when no graph division has occurred, and so $Q_{DW}=0$. Also, in division example (2), optimal division has occurred, which results in $Q_{DW}=0.367$, and this matches an intuitive division. Though the division is not optimal in division example (3), it is close to optimal, and so the resulting $Q_{DW}=0.122$ is a slight degradation from the optimal value.

Division example (4) and division example (5) are examples where irrational division has been performed, and the result in these cases are $Q_{Dw}$ values that are negative, and the bad values match intuition. Division example (6) depicts a complete division, which results with a value of $Q_{DW}=-0.163$, and the poor result of this excessive division is represented by this value. It may be observed from division examples (1) through (6) that the modularity assessment function $Q_{DW}$ is in alignment with intuition.

FIG. 10 is an explanatory diagram illustrating the adjacency matrix A using the relationship graph information 410 depicted in FIG. 7 and the essentiality information 420 depicted in FIG. 8. Element $A_{ij}$ of the adjacency matrix A represents the essentiality from vertex i, which is the originating entity of the relationship, to vertex j, which is the receiving entity of the relationship.

FIG. 11 is an explanatory diagram illustrating a parameter table associated with $k^{in}_j$ and $k^{out}_i$ for each entity using the relationship graph information 410 depicted in FIG. 7 and the essentiality information 420 depicted in FIG. 8. A parameter table 1100 is a table generated during the calculation of the modularity assessment function $Q_{DW}$. Furthermore, m=10 in this example.

The process of clustering using essentiality is described here. First, a description of the definition of symbols and notation regarding the clustering process using essentiality is provided. The set of all graph vertices is referred to as "V." Vertices represent entities. Vertices are represented with at least one integer sequence number, and the vertex number is referred to as "n". For example, V={1, 2, . . . , n}. Division with a V is referred to as "D". "D" is a set consisting of elements, which is a group of subsets $S_i$ that have a common V to which are not empty sets, and this is represented as "D={$S_1, S_2, S_3, \ldots, S_{|D|}$}." The "|D|" represents the number of elements for a division D.

Here, set V is expressed with the following Expression (7).

$$S_1 \cup S_2 \cup \ldots \cup S_{|D|} = V \quad (7)$$

When vertex i is an element of $S_x$, cluster $c_i$ of vertex i equals x. In other words, establishing a division D determines the value of the modularity assessment function $Q_{DW}$. In this case, this is represented as $Q_{DW}(D)$. Also, the combining of two different elements, expressed by $S_i$ and $S_j$, within a division D is defined by the following Expression (8) to produce the result of D [i, j].

$$D[i,j] = (D - \{S_i\} - \{S_j\}) \cup \{S_i \cup S_j\} \quad (8)$$

Here, in Expression (8), A−B represents the difference set after removing the elements of set B from set A. When a division D also has a state k, this is expressed with $D^{(k)} = \{S^{(k)}_1, S^{(k)}_2, \ldots, S^{(k)}_{|D(k)|}\}$. Regarding $D = \{S_1, S_2, S_3, S_4\}$ for example, when combining subsets $S_1$ and $S_2$, the post-combined division D [i, j] is expressed as D [i, j]=D [1, 2]={$S_1 \cup S_2, S_3, S_4$}. $S_1 \cup S_2$ is a union of subsets $S_1$ and $S_2$.

Figure 12:
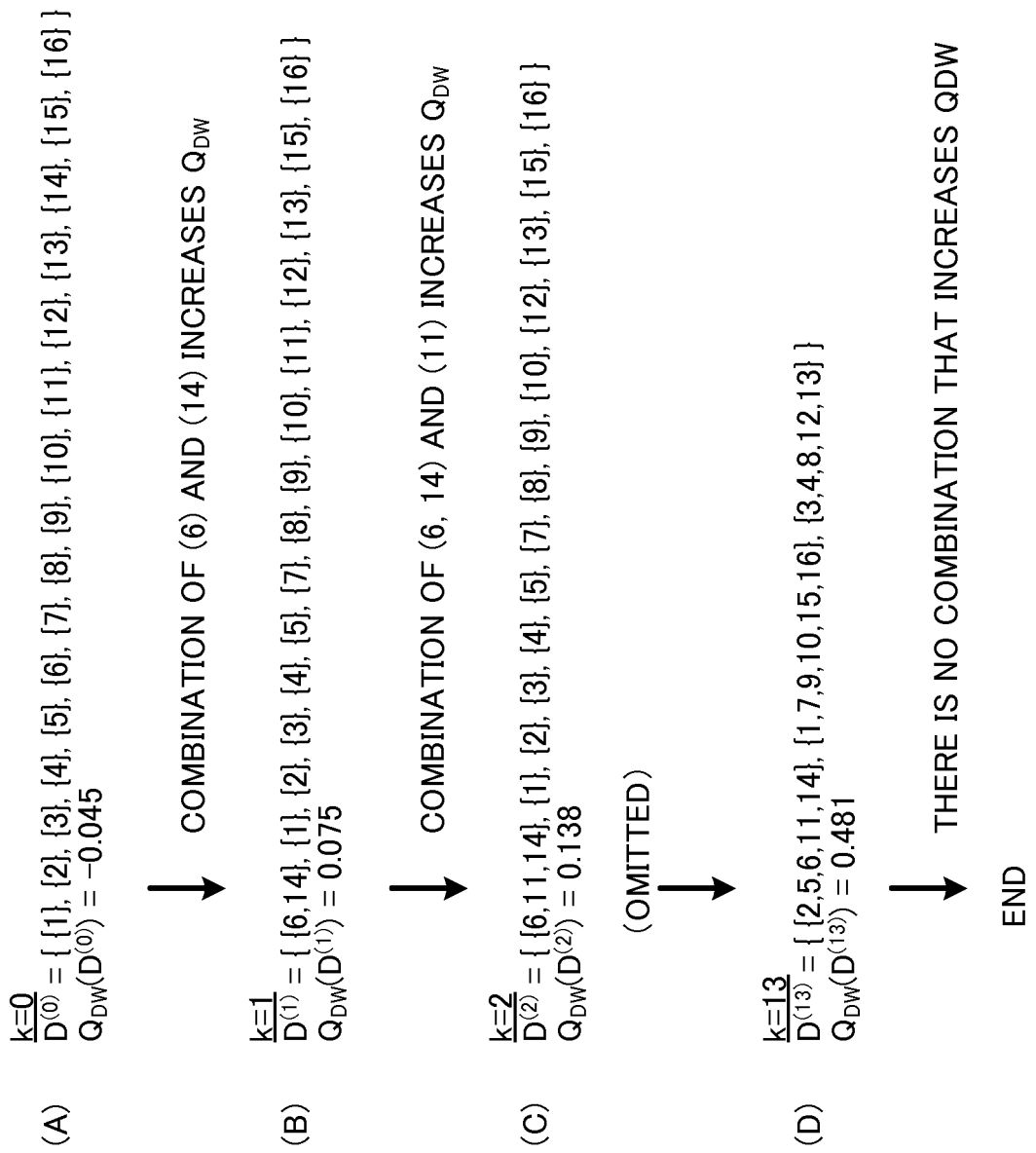
FIG. 12 is an explanatory diagram illustrating the process of clustering that uses the essentiality information when using the relationship graph information depicted in FIG. 7 and the essentiality information depicted in FIG. 8.

FIG. 12 is an explanatory diagram illustrating the process of clustering that uses the essentiality information when using the relationship graph information 410 depicted in FIG. 7 and the essentiality information 420 depicted in FIG. 8. Furthermore, the modularity assessment function $Q_{DW}$ for a division D at a state k is expressed as $Q_{DW}(D^{(k)})$.

(A) in FIG. 12 illustrates the initial state (k=0) for a division $D^{(0)}$. The initial state is when one vertex becomes one cluster. The modularity assessment function $Q_{DW}(D^{(0)})$ in this case is $Q_{DW}(D^{(0)}) = -0.045$. From this state, two subsets are exhaustively combined, and the combination with the highest post-combination $Q_{DW}$ is taken to produce the next state (k=1). In this case, the combination of subsets {6} and {14} is the combination with the highest $Q_{DW}$ value.

(B) in FIG. 12 illustrates the next state (k=1) of (A) for a division $D^{(1)}$. The modularity assessment function $Q_{DW}(D^{(1)})$ in this case is $Q_{DW}(D^{(1)}) = 0.075$. From this state, two subsets are exhaustively combined, and the combination with the highest post-combination $Q_{DW}$ is taken to produce the next state (k=2). In this case, the combination of subsets {6, 14} and {11} is the combination with the highest $Q_{DW}$ value.

(C) in FIG. 12 illustrates the next state (k=2) of (B) for a division $D^{(2)}$. The modularity assessment function $Q_{DW}(D^{(2)})$ in this case is $Q_{DW}(D^{(2)}) = 0.138$. From this state, two subsets are exhaustively combined, and the combination with the highest post-combination $Q_{DW}$ is taken to produce the next state (k=3). This process continues repeatedly.

(D) in FIG. 12 illustrates the state where this process has been repeated 13 times from the initial state, in which k=13 for a division $D^{(13)}$. $Q_{DW}(D^{(13)}) = 0.481$. From this state, two subsets are exhaustively combined. For the state where k=13, there is a combination of subsets {2, 5, 6, 11, 14} and {1, 7, 9, 10, 15, 16}, a combination of subsets {2, 5, 6, 11, 14} and {3, 4, 8, 12, 13}, and a combination of subsets {1, 7, 9, 10, 15, 16} and {3, 4, 8, 12, 13}. Any of these combinations lowers the value of $Q_{DW}(D^{(13)}) = 0.481$, and so clustering stops here at the division $D^{(13)}$. As a result, the software has been divided into the 3 subsets {2, 5, 6, 11, 14}, {1, 7, 9, 10, 15, 16}, and {3, 4, 8, 12, 13}.

Figure 13:
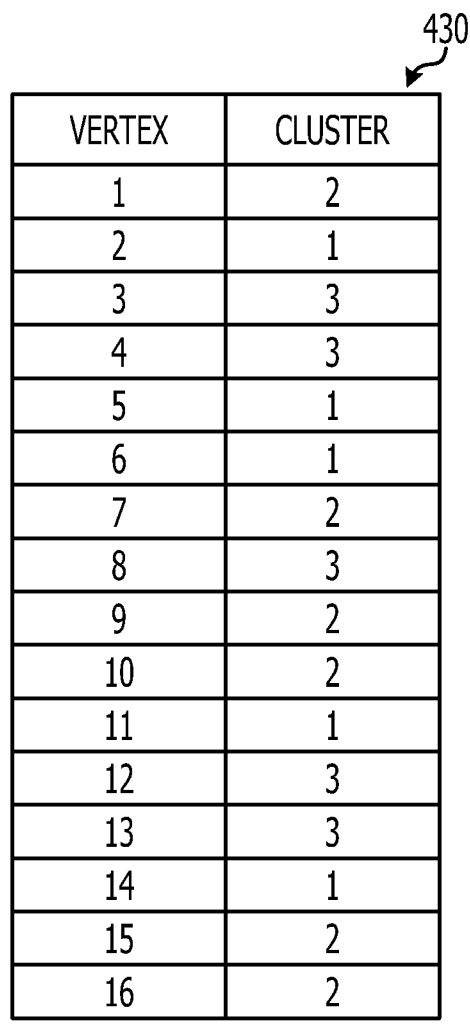
FIG. 13 is an explanatory diagram illustrating an example of an analysis result based on the clustering in FIG. 12.

FIG. 13 is an example explanatory diagram illustrating the analysis result 430 based on the clustering in FIG. 12. The software has been divided into 3 subsets in FIG. 12, and so subset {2, 5, 6, 11, 14} is given a cluster number: 1, subset {1, 7, 9, 10, 15, 16} is given a cluster number: 2, and subset {3, 4, 8, 12, 13} is given a cluster number: 3. As a result, it may be seen that in the first row vertex 1 belongs to cluster 2 for example. Furthermore, in addition to the table data as depicted in FIG. 11, the analysis result 430 may also include tree structure data representing the combinations depicted in FIG. 10, or may also include the relationship graph information 410 and the essentiality information 420.

Figure 14:
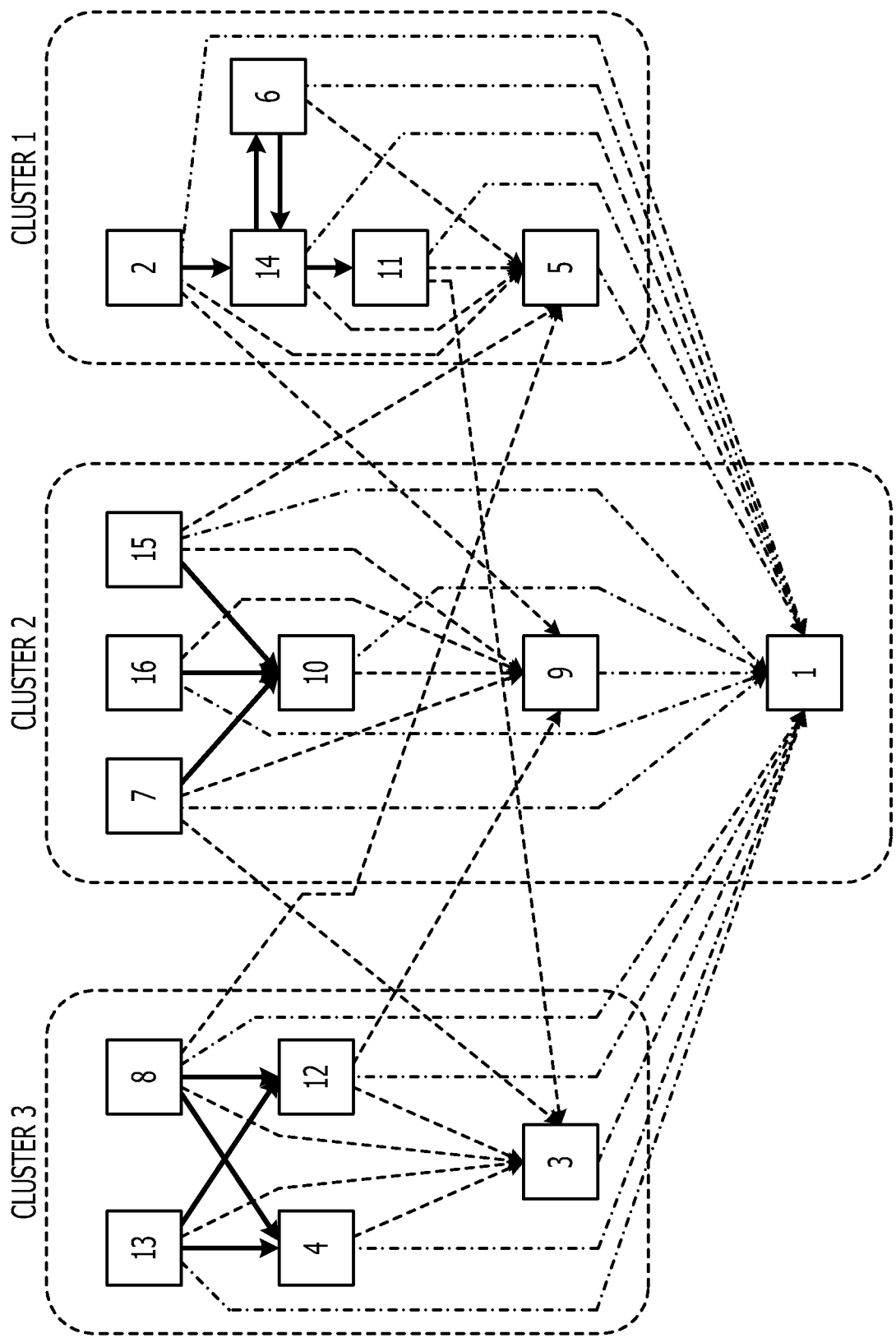
FIG. 14 is an explanatory diagram illustrating another example of an analysis result based on the clustering in FIG. 12.

FIG. 14 is an explanatory diagram illustrating another example of an analysis result based on the clustering in FIG. 12. The graph in FIG. 14 is a logical structure graph identical to the graph in FIG. 5, and summarizes the automatic division based on the analysis result 430 in FIG. 13. In FIG. 14, the enclosed, thick dashed lines represent where the software is divided. The arrows are drawn using 3 different types of lines, thick, straight lines, medium-sized dotted lines, and fine dotted lines, which represent the strength level (strong, medium, and weak) of the essentiality for the dependent relationship. A user may gain an understanding of the software structure by simply glancing at the graph in FIG. 14. Also, it may be understood that the 3 divisions, which have been obtained, are rational. According to the First Embodiment, the result is a software analysis that satisfies the qualities (1) through (3) described above.

Example Division Processing Sequence

Figure 15:
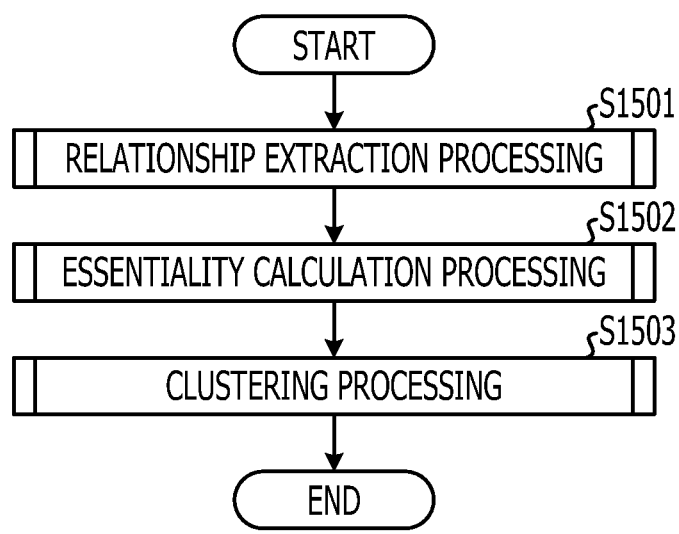
FIG. 15 is a flowchart illustrating an example division processing sequence for a dividing device according to the First Embodiment.

FIG. 15 is a flowchart illustrating an example division processing sequence for the dividing device 400 according to the First Embodiment. The dividing device 400 executes the relationship extraction process via the relationship extraction unit 401 (step S1501), the essentiality calculation unit process via the essentiality calculation unit 402 (step S1502), and the clustering process via the dividing unit 403 (step S1503). The analysis result 430 as depicted in FIG. 14 is obtained as a result.

Figure 16:
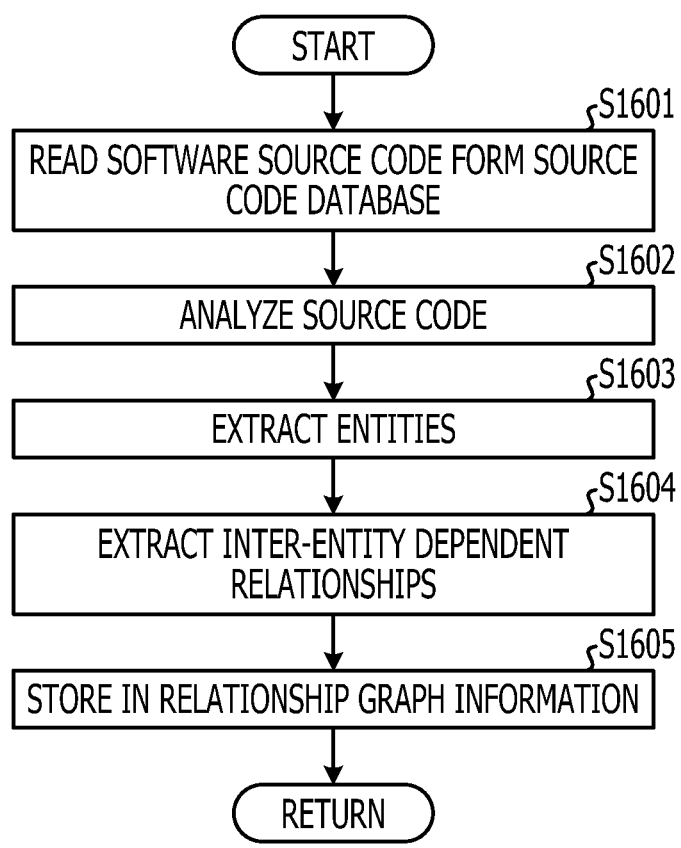
FIG. 16 is a flowchart illustrating a detailed example division processing sequence for a relationship extraction processing (step S1501) depicted in FIG. 15.

FIG. 16 is a flowchart illustrating a detailed example division processing sequence for the relationship extraction processing (step S1501) depicted in FIG. 15. First, the dividing device 400 reads the software source code from the source code database 450 (step S1601). Next, the dividing device 400 analyzes the read source code using text analysis technologies and static analysis technologies (step S1602). The dividing device 400 then extracts the entities from the analyzed source code (step S1603), and at the same time also extracts the inter-entity dependent relationships (step S1604).

After this, the dividing device 400 stores the originating entity of the relationship and the receiving entity of the relationship obtained from the extraction as a record of the relationship graph information 410 (step S1605), and the relationship extraction processing (step S1501) terminates here. As a result, the relationship graph information 410 is generated.

Figure 17:
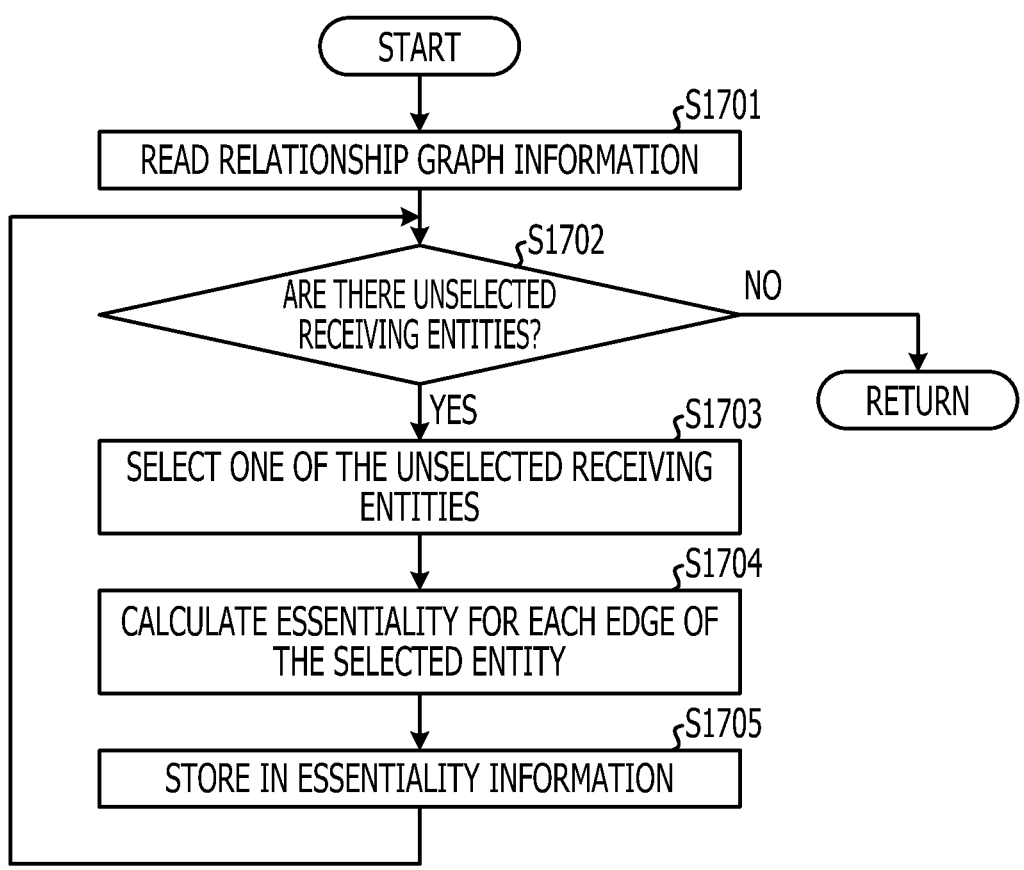
FIG. 17 is a flowchart illustrating a detailed example processing sequence for an essentiality extraction processing (step S1502) depicted in FIG. 15.

FIG. 17 is a flowchart illustrating a detailed example division processing sequence for an essentiality calculation processing (step S1502) shown in FIG. 15. First, the dividing device 400 reads the relationship graph information 410 (step S1701), and determines whether there are any unselected entities (step S1702). When there are unselected receiving entities of the relationship (Yes in step S1702), the dividing device 400 selects one of the unselected receiving entities of the relationship (step S1703).

The dividing device 400 then uses Expression (1) to calculate the essentiality for each edge of the selected entity (step S1704). The dividing device 400 then stores the essentiality calculated for each edge to the essentiality information 420 (step S1705), and returns to step S1702. Regarding step S1702, the dividing device 400 terminates the essentiality calculation processing (step S1502) when it has determined that there are no unselected receiving entities of the relationship (No in step S1702). As a result, the essentiality information 420 is generated.

Figure 18:
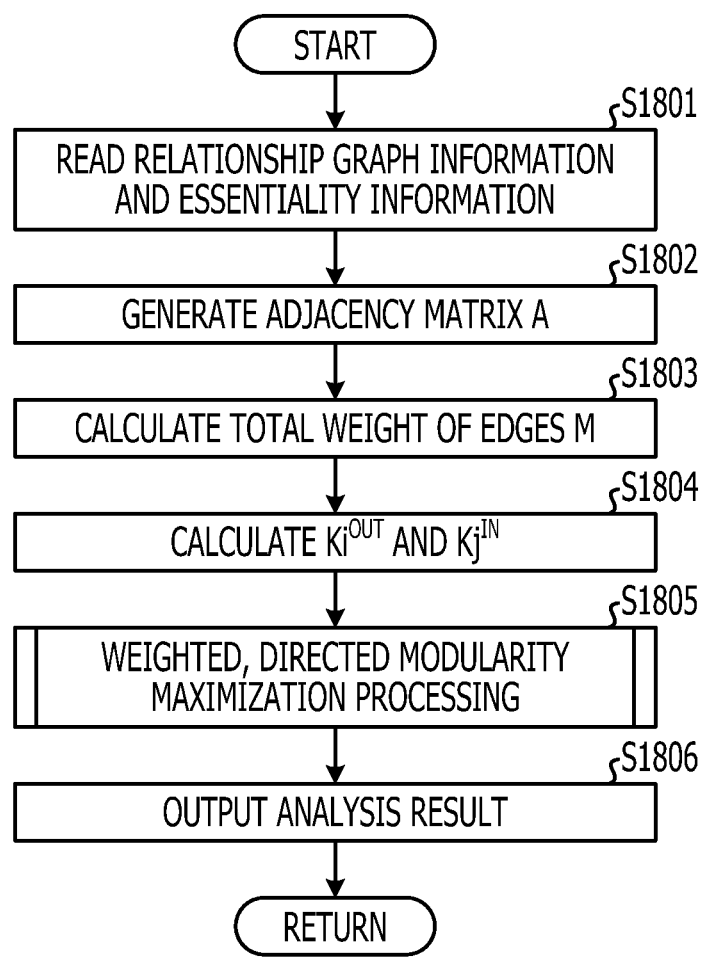
FIG. 18 is a flowchart illustrating a detailed example processing sequence for a clustering processing (step S1503) depicted in FIG. 15.

FIG. 18 is a flowchart illustrating a detailed example division processing sequence for clustering processing (step S1503) shown in FIG. 15. First, the dividing device 400 reads the relationship graph information 410 and the essentiality information 420 (step S1801), and generates the adjacency matrix A (step S1802). Also, the dividing device 400 calculates the value of parameter m for the modularity assessment function $Q_{DW}$ (step S1803), by calculating the weight of the edge, which is the element Aij of the adjacency matrix A. Also, the dividing device 400 also calculates parameters $k_i^{OUT}$ and $k_j^{IN}$ for the modularity assessment function $Q_{DW}$ (step S1804).

After this, the dividing device 400 executes a weighted, directed modularity maximization processing (step S1805). At the weighted, directed modularity maximization processing (step S1805), the dividing device 400 continues to combine subsets until the value of the modularity assessment function $Q_{DW}$ is maximized. Details on the weighted, directed modularity maximization processing (step S1805) are described in FIG. 19.

The dividing device 400 then outputs the analysis result obtained at the weighted, directed modularity maximization processing (step S1805) as the analysis result 430 (step S1806). For example, the dividing device 400 may display the analysis result 430 as depicted in FIG. 14 to the display 308, print it out to the printer 313, transmit it to another device, or store it in a storage device within the dividing device 400, and then the clustering process (step S1503) terminates.

Figure 19:
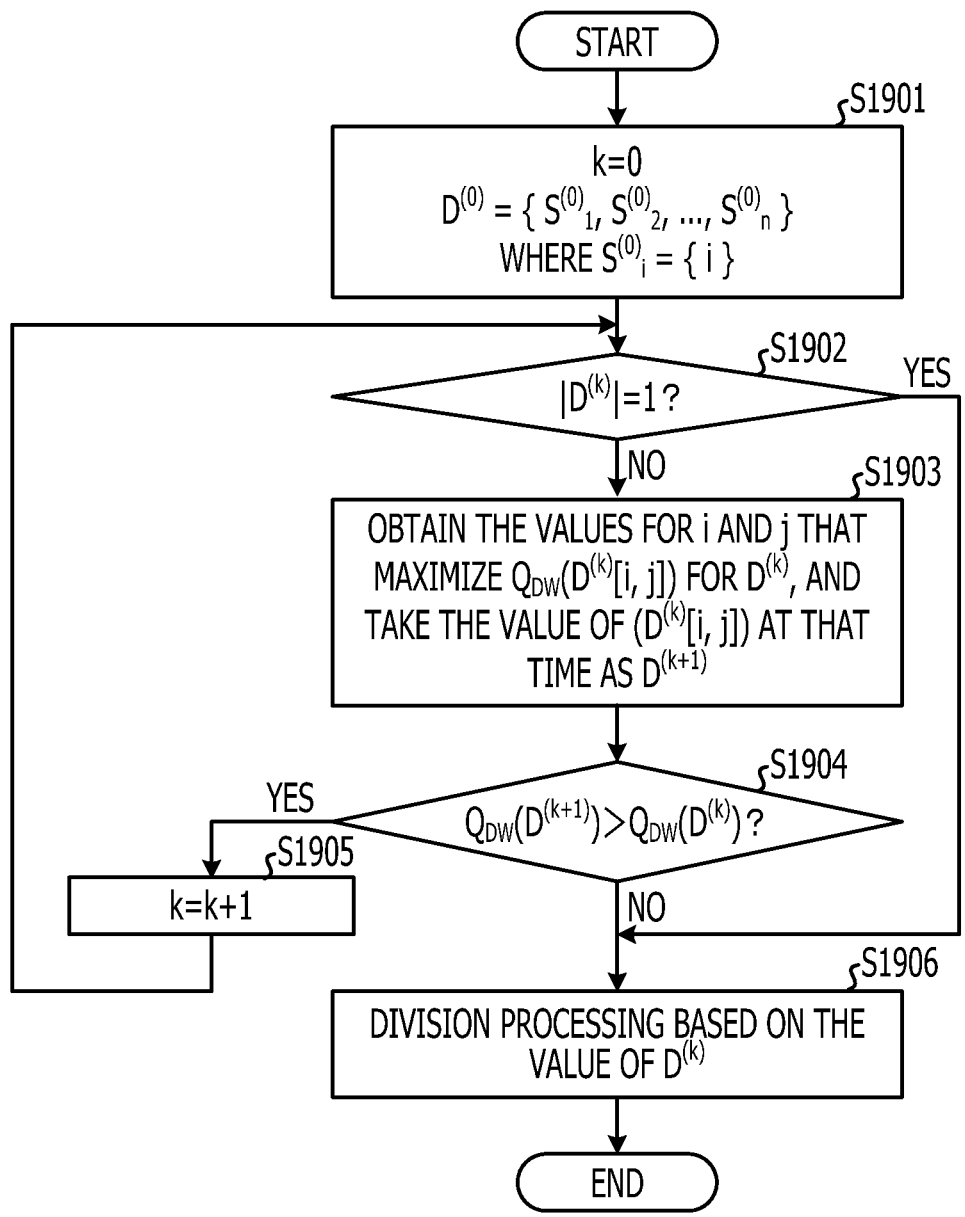
FIG. 19 is a flowchart illustrating a detailed example processing sequence for a weighted, directed modularity maximization processing (step S1805).

FIG. 19 is a flowchart illustrating a detailed example division processing sequence for the weighted, directed modularity maximization processing (step S1805). First, the dividing device 400 sets the initial state to k=0, and sets the division to division $D^{(k)}=D^{(0)}=\{S^{(0)}_1, S^{(0)}_2, \ldots, S^{(0)}_n\}$ (step S1901). Next, the dividing device 400 determines whether $|D^{(k)}|=1$ (step S1902).

When the state is not $|D^{(k)}|=1$ (No in step S1902), the dividing device 400 obtains a group of i and j that has a maximum value for the modularity assessment function $Q_{DW}$ corresponding to division $D^{(k)}$, and division $D^{(k)}[i, j]$ is set to division $D^{(k+1)}$ here (step S1903). The dividing device 400 then compares the $Q_{DW}(D^{(k)})$ with $Q_{DW}(D^{(k+1)})$ (step S1904). Then, if $Q_{DW}(D^{(k+1)})$ is greater than $Q_{DW}(D^{(k)})$ (Yes in step S1904), there is room for the value of $Q_{DW}$ to still be increased, and so the dividing device 400 increments k (step S1905) and returns to step 1902. FIG. 12 illustrates a looping of steps S1902 through S1905.

When the state in step S1902 is $|D^{(k)}|=1$ (Yes in step S1902), this indicates that no further division is desirable, and the process proceeds to step S1906. Also, in step S1904, when $Q_{DW}(D^{(k+1)})$ is not greater than $Q_{DW}(D^{(k)})$ (No in step S1904), this indicates that there is no more room for the value of $Q_{DW}$ to be increased, and the process proceeds to step S1906.

At step S1906, the dividing device 400 performs the division processing for the division $D^{(k)}$. For example, the dividing device 400 generates the analysis result 430 as depicted in FIG. 13 and FIG. 14 using the division $D^{(k)}$. As a result, the weighted, directed modularity maximization processing (step S1805) terminates here.

According to the First Embodiment, software is handled as sets of entities that form the structural elements of the software, and may be divided into subsets that are easily understood, and in doing so improves the level of precision for division.

Second Embodiment

A Second Embodiment is described next. With the Second Embodiment, the "essentiality" described in the First Embodiment is defined as context more applicable to practice. More specifically, several functions including "essentiality compensation", "multi-level analysis", "virtual path analysis", and "context dependent analysis" are added to the essential calculating unit 402 of the First Embodiment.

Functional Configuration Example of Essentiality Calculating Unit 402

Figure 20:
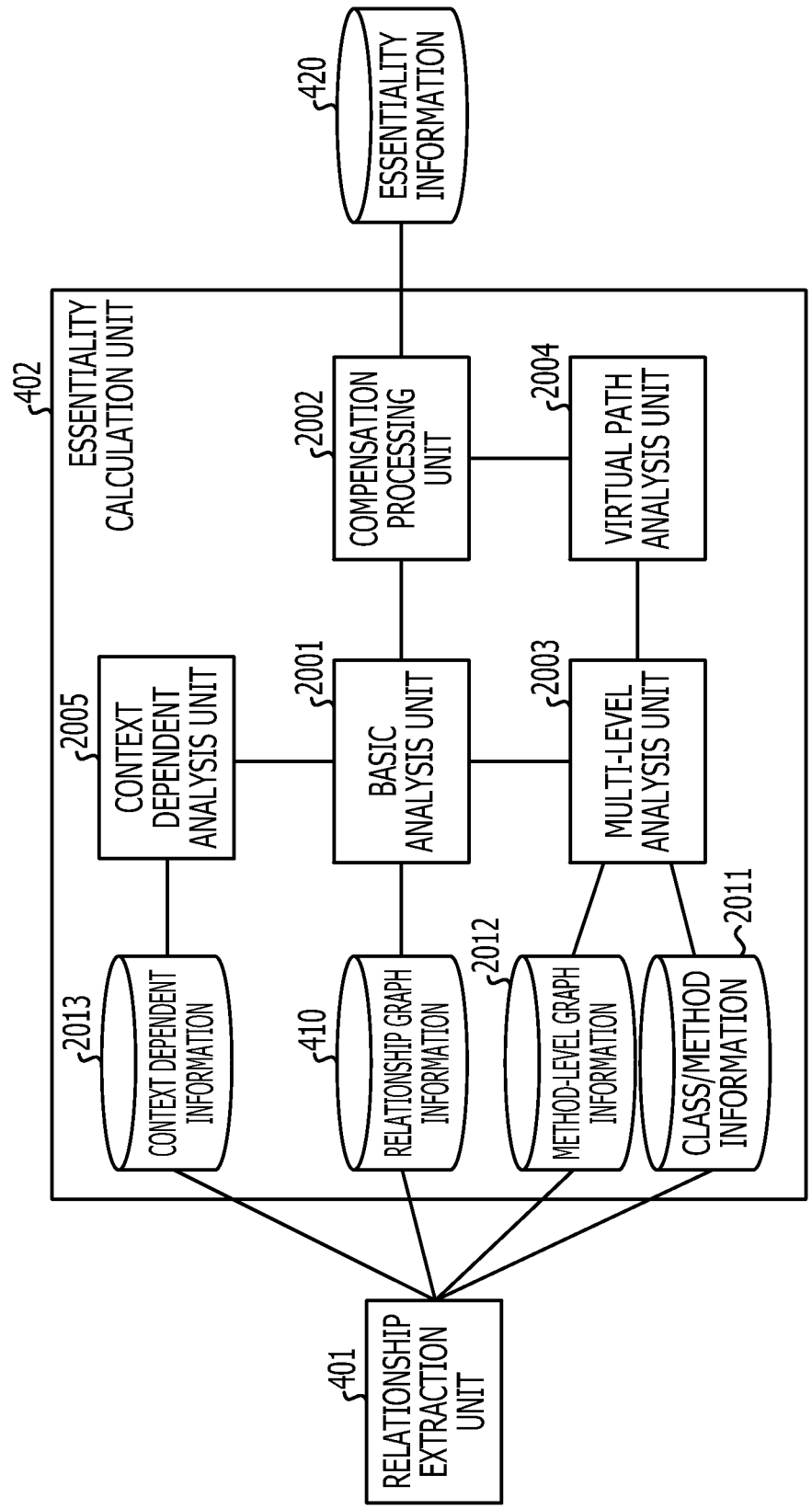
FIG. 20 is a block diagram illustrating a detailed functional configuration example for an essentiality calculating unit according to a Second Embodiment.

FIG. 20 is a block diagram illustrating a detailed functional configuration example for the essentiality calculating unit 402 according to the Second Embodiment. The essentiality calculating unit 402 includes a basic analysis unit 2001, a compensation processing unit 2002, a multi-level analysis unit 2003, a virtual path analysis unit 2004, and a context dependent analysis unit 2005. According to the Second Embodiment, in addition to the relationship graph information 410, the relationship extraction unit 401 may also supply a class/method information 2011, a method level graph information 2012, and a context dependent information 2013 to the essentiality calculating unit 402. According to the Second Embodiment, it is sufficient to include at least any one of the compensation processing unit 2002, the multi-level analysis unit 2003, the virtual path analysis unit 2004, and the context dependent analysis unit 2005.

The basic analysis unit 2001, the compensation processing unit 2002, the multi-level analysis unit 2003, the virtual path analysis unit 2004, and the context dependent analysis unit 2005 are, for example, functions that are implemented as programs stored in a storage device such as the ROM 302, the RAM 303, the magnetic disk 305, the optical disc 307 depicted in FIG. 13, or the like, and executed by the CPU 301 or through the I/F 309. The following is a description of FIG. 20.

The basic analysis unit 2001 is the actual function of the essentiality calculation unit 402 from the First Embodiment. Therefore, the basic analysis unit 2001 uses the Expression (1) to calculate the essentiality of each edge. Also, the basic analysis unit 2001 may also calculate the essentiality of sub-entities such as methods, in the same way as entities, and this is described later.

When a certain entity in the entity group has dependent relationships with multiple receiving entities of the relationship, the compensation processing unit 2002 compensates the essentiality related to each of the multiple entities for its entity, based on the total essentiality related to the dependent relationships between its entity and the multiple entities. Specifically, when the originating entity of the relationship has relationships with multiple entities, for example, there is a potential that any of the entities is essential from its perspective. Under this kind of presumed situation, it is desirable to compensate when the total essentiality of the dependent relationships from the originating entity of the relationship is low.

Figure 21:
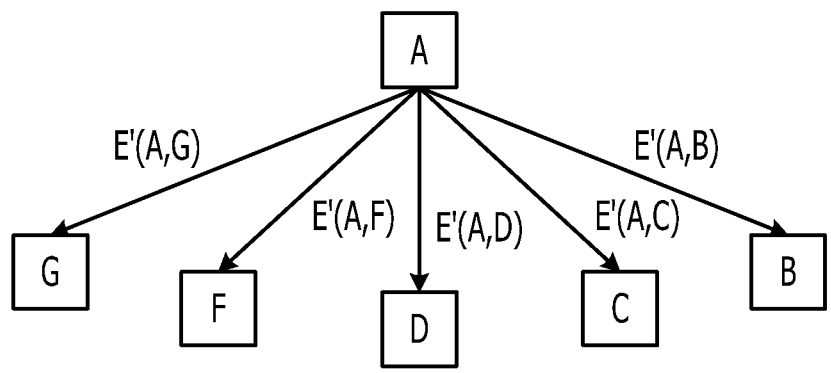
FIG. 21 is an explanatory diagram illustrating an example compensation of essentiality.

FIG. 21 is an explanatory diagram illustrating an example compensation of essentiality. In FIG. 21, entity A is the originating entity of the relationship, and entities B, C, D, F, and G are the receiving entities of the relationship for entity A.

Here, E' (A, X) is the essentiality before compensation. X is a generic term for the receiving entity of the relationship. For FIG. 21, X=B, C, D, F, and G. E' (A, X) represents the essentiality of dependent relationships from entity A to entity X before compensation. Compensation related to entity A is performed with the following sequence.

(1) The total essentiality of all dependent relationships from the originating entity of the relationship entity A to the receiving entities of the relationship is obtained from the expression $T=\Sigma_X E'(A, X)$. In the example in FIG. 21, the total essentiality T is the sum of each essentiality from entity A to entities B, C, D, F, and G.

(2) If T is less than 1, the compensated essentiality E (A, X) is obtained from Expression (9).

$$E(A,X)=E'(A,X)/T \qquad (9)$$

As the above Expression (9) is applied when T is less than 1, the post-compensation essentiality E (A, X) is higher than the pre-compensation essentiality E' (A, X). In contrast, if T is greater than or equal to 1, the pre-compensation essentiality E' (A, X) is used as the compensated essentiality E (A, X). In other words, the pre- and post-compensation essentiality has not changed. This kind of compensation is executed for each originating entity of the relationship. The post-compensation essentiality is stored as the essentiality information 420 illustrated in FIG. 8, replacing the pre-compensation essentiality. As a result, the dividing unit 403 may execute the clustering process using the post-compensation essentiality obtained by the compensation processing unit 2002.

Next, the multi-level analysis unit 2003 is described. When the relationship between classes is analyzed, the multi-level analysis unit 2003 performs analysis by using a relationship between methods, which is more detailed, and so summarizes the inter-class relationships at a higher level of abstraction. As a result, essentiality with a potential to be analyzed at a higher level of precision may be obtained.

Here, a graph illustrating classes included in software as entities is referred to as a class level graph. Also, a graph illustrating methods included in software as entities is referred to as a method level graph. Methods belong to classes. In other words, when entities represent classes, methods are subentities, which are the structural elements.

Figure 22:
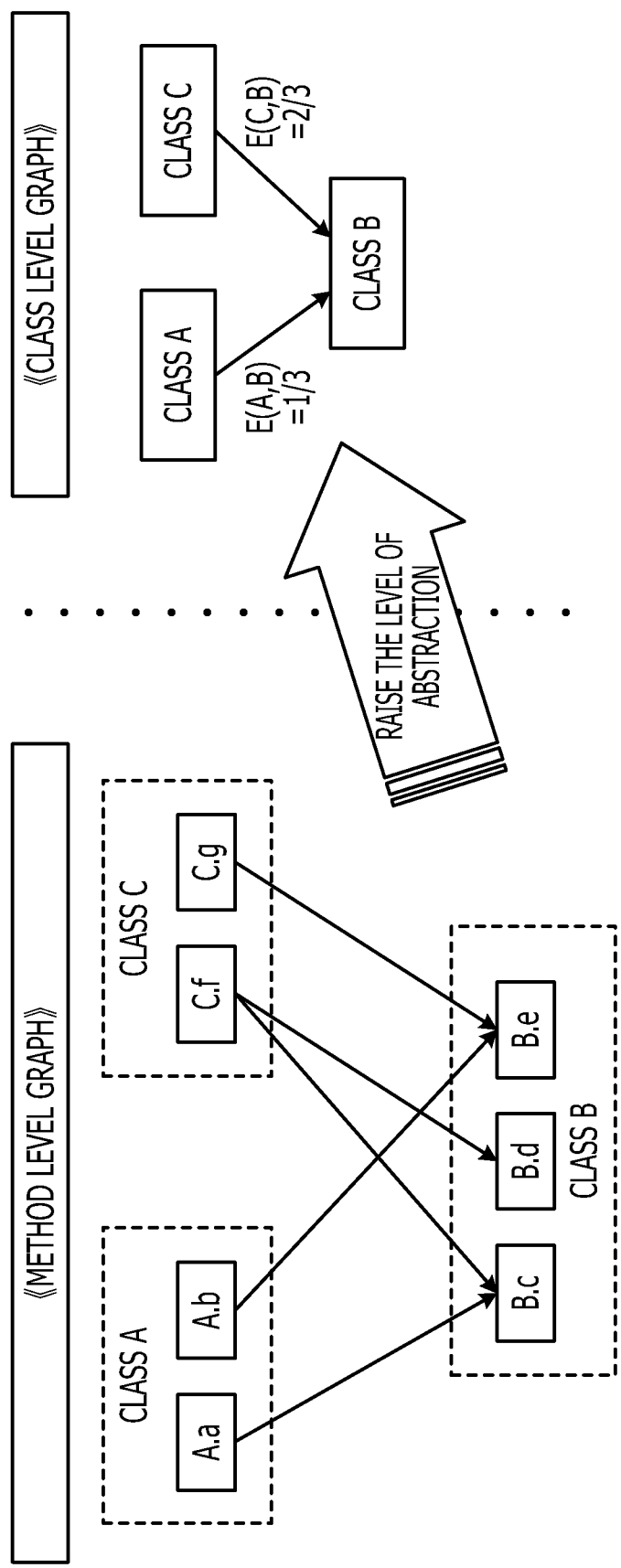
FIG. 22 is an example explanatory diagram illustrating a method level graph and a class level graph.

FIG. 22 is an example explanatory diagram illustrating a method level graph and a class level graph. Regarding the method level graph, class A includes methods A.a and A.b. Class B includes methods B.c, B.d, and B.e. Class C includes methods C.f and C.g. The relationship between classes and methods are stored as class/method information.

Figure 23:
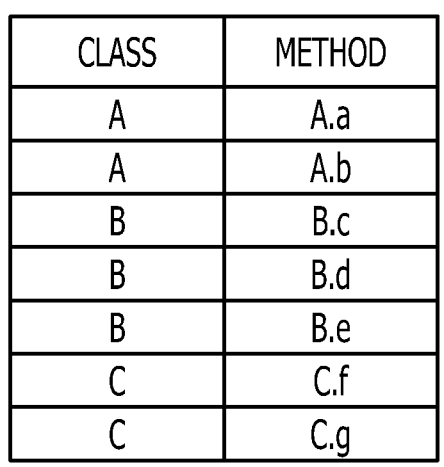
FIG. 23 is an example explanatory diagram illustrating class and method information.

FIG. 23 is an example explanatory diagram illustrating a class/method information 2011. The class/method information 2011 is stored in a storage device, and is a table that contains the classes and the methods, and maps the methods to the class for which they belong. Also, arrows in the method level graph represent dependent relationships, which is the same as the First Embodiment. For example, method A.a is the originating entity of the relationship for method B.c, and method B.c is the receiving entity of the relationship for method A.a. The class/method information 2011 is extracted by the relationship extraction unit 401. The inter-method relationships are stored as a method level graph information 2012.

Figure 24:
FIG. 24 is an example explanatory diagram illustrating method level graph information.

FIG. 24 is an example explanatory diagram illustrating the method level graph information 2012. The method level graph information 2012 is stored in a storage device. The method level graph information 2012 stores the mapping of the originating entity of the relationship to its receiving entities of the relationship. Returning to FIG. 22, method B.c of class B has originating entities of the relationship method A.a of class A and method C.f of class C. Therefore, the essentiality E (A.a, B.c) from method A.a to method B.c is represented as E (A.a, B.c)=½, and similarly the essentiality E (C.f, B.c) from method C.f to method B.c is represented as E (C.f, B.c)=½.

Also, method B.d of class B has only the originating entity of the relationship method C.f of class C. Therefore, the essentiality E (C.f, B.d) from method C.f to method B.d is represented as E (C.f, B.d)=1. Also, method B.e of class B has originating entities of the relationship method A.b of class A and method C.g of class C. Therefore, the essentiality E (A.b, B.e) from method A.b to method B.e is represented as E (A.b, B.e)=½, and similarly the essentiality E (C.g, B.e) from method C.g to method B.e is represented as E (C.g, B.e)=½. The method level graph information 2012 is extracted by the relationship extraction unit 401.

The multi-level analysis unit 2003 creates a class level graph by grouping the methods which belong to the same class as in the method level graph. In other words, the class level graph is one level of abstraction higher than the method level graph. When the level of abstraction is raised, the essentiality at the method level is grouped together at the class level.

Specifically, the class level essentiality E (A, B) is obtained with the following Expression (10).

$$E(A, B) = \sum_{i=1}^{n} \frac{1}{xd_{in}(m_i) \cdot mx(B)} \qquad (10)$$

Regarding Expression (10) above, $xd_{in}(m_i)$ calls a certain method $m_i$, and is the number of methods that belong to a different class. i is the number that identifies the method. mx(B) is included in a certain class B, and is the number of methods called from a different class. Also, when methods belonging to a certain class A call methods belonging to class B, the set of called methods belonging to class B is represented as $M_{AB}$, and thus $M_{AB}=\{m_1, m_2, \ldots, m_i, \ldots, m_n\}$. n is the number of set elements, and is greater than or equal to one. When methods belonging to class A do not call methods belonging to class B, the state is E (A, B)=0.

In the example class level graph in FIG. 22, the essentiality E (A, B) from class A to class B is calculated as described below. Class B has 3 methods called from class A and class C, and so mx(B)=3. Method B.c of class B is called from method A.a of class A and method C.f of class C, and so $xd_{in}$ (B.c)=2. Similarly, $xd_{in}$ (B.d)=1, and $xd_{in}$ (B.e)=2. Also, the set $M_{AB}$ of called methods belonging to class B are represented as $M_{AB}=\{B.c, B.e\}$. Also, the element number n for set $M_{AB}$ is 2.

Therefore, the values used in the Expression (10) described above are mx(B)=3, $xd_{in}$(B.c)=2, $xd_{in}$(B.d)=1, and $xd_{in}$(B.e)=2, and n=2, in which in the example class level graph in FIG. 22, the essentiality E (A, B) from class A to class B is: E (A, B)=1/(2×3)+1/(2×3)=⅓. Similarly, in the example class level graph in FIG. 22, the essentiality E (C, B) from class C to class B is: E (C, B)=1/(2×3)+1/(1×3)+1/(2×3)=⅔.

Furthermore, a note regarding the class level graph in FIG. 22, obtaining the essentiality E (A, B), E (C, B) according to the First Embodiment will produce a result of E (A, B)=E (C, B)=½, which differs from the result of E (A, B)=⅓, E (C, B)=⅔. In other words, the fact that the connection between class B and class C is stronger than the connection between class A and class B is not revealed until method level analysis is performed. The essentiality E (A, B)=⅓, E (C, B)=⅔ result obtained by the multi-level analysis unit 2003 is stored in the essentiality information 420 depicted in FIG. 8. As a result, the dividing unit 403 may execute clustering processing using the essentiality obtained by the multi-level analysis unit 2003.

In this way, the multi-level analysis unit 2003 performs a more detailed analysis on inter-method relationship information when analyzing inter-class relationships, and so summarizes the inter-class relationships, which are one level of abstraction higher, and so this allows the obtaining of the essentiality with a potential for analysis with a high level of precision.

Furthermore, the multi-level analysis unit 2003 may add a graph, which identifies that the multi-level analysis is complete, to the relationship graph information 410 record for the originating entity of the relationship and the receiving entity of the relationship, which has been multi-level analyzed. Thus, the virtual path analysis unit 2004 may discern regarding which record multi-level analysis has been performed, by referencing the relationship graph information 410.

Next, the virtual path analysis unit 2004 is described. The virtual path analysis unit 2004 regenerates important information from the method level graph that is lost during the summarization by multi-level analysis unit 2003, and it does so by an expression using a virtual path. Here, for the path between two entities that is not adjacent, the multiplied value of all the essentiality for multiple edges in the applicable path is referred to as a "cumulative essentiality."

Figure 25B:
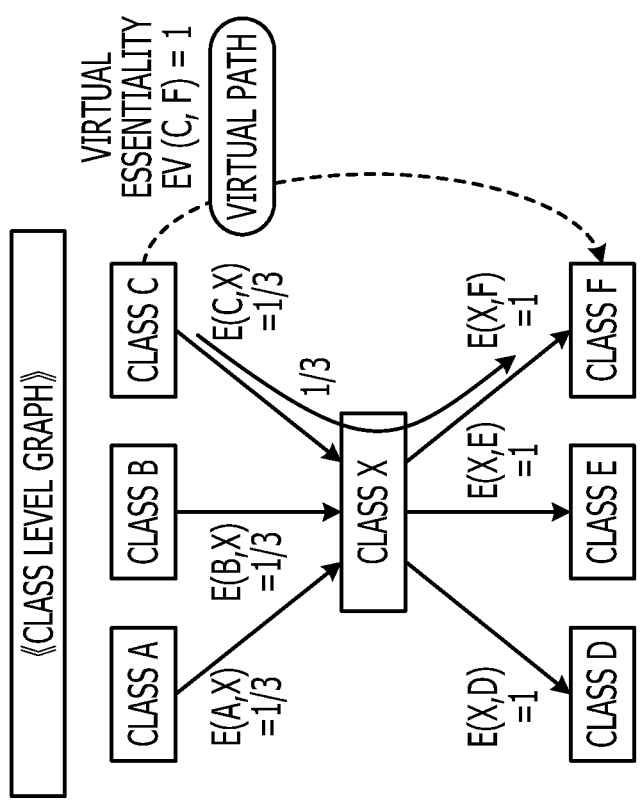
FIG. 25A and FIG. 25B are explanatory diagrams illustrating an example virtual path analysis.
Figure 25A:
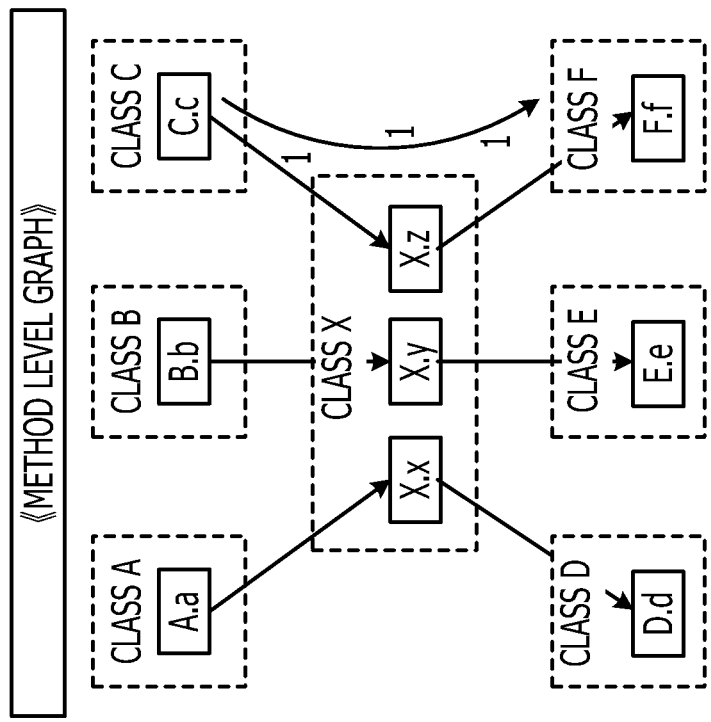

FIG. 25A and FIG. 25B are explanatory diagrams illustrating examples of virtual path analysis. FIG. 25A is a method level graph, and FIG. 25B is a class level graph which contains the method level graph in (A) that has been summarized by the multi-level analysis unit 2003. Each essentiality in the class level graph E (A, X), E (B, X), E (C, X), E (X, D), E (X, E), and E (X, F) is obtained by the multi-level analysis unit 2003 described above.

Regarding the class level graph, the cumulative essentiality from class C to class F is E (C, X)×E (X, F)=⅓. Taking this and looking at the method level graph, it may be seen that method F.f is normally called from method C.c, and so the cumulative essentiality from method F.f to method C.c is E (C.c, X.z)×E (X.z, F.f)=1. As the method level analysis produces a cumulative essentiality of 1, though the class level result is ⅓, it may be seen that information has been lost by changing the level of abstraction to the class level. Here, the edge from class C to class F is added virtually to compensate for this lost information. The added edge is referred to as a virtual path. Also, virtual essentiality is defined as the essentiality derived through the virtual path.

Regarding the method level graph, the virtual essentiality Ev (A, B) from class A to class B is defined as the average cumulative essentiality of all combinations from methods belonging to class A to methods belonging to class B. Specifically, when the virtual essentiality Ev (A, B) is larger than the cumulative essentiality from class A to class B of the class level graph, the edges from class A to class B of the class level graph are added as the virtual path. Thus, the essentiality after this addition is the value of Ev (A, B).

As described above, regarding the method level graph, essentiality E (C.c, X.z)=1, E (X.z, F.f)=1, and so the cumulative essentiality from method C.c to method F.f is represented as E (C.c, X.z)×E (X.z, F.f)=1×1=1. Therefore, the virtual essentiality Ev (C, F) is represented as Ev (C, F)=(the cumulative essentiality from method C.c to method F.f)/1=1/1=1. As there is only one combination from methods belonging to class C to methods belonging to class F, the denominator is 1.

The virtual essentiality Ev (C, F) is larger than the cumulative essentiality of ⅓ from class C to class F, the virtual path edge from class C to class F is added as depicted in FIG. 25B. The essentiality of the added edge is represented as Ev (C, F)=1. The virtual path obtained by the virtual path analysis unit 2004 is stored in relationship graph information 410. The virtual essentiality obtained by the virtual path analysis unit 2004 is also stored in the essentiality information 420. With the examples in FIG. 25A and FIG. 25B, a record is added to relationship graph information 410, in which the originating entity of the relationship is class C, and the receiving entity of the relationship is class F. Also, the essentiality Ev (C, F)=1 is added to the essentiality information 420 regarding the applicable record. As a result, the dividing unit 403 may execute the clustering processing using the essentiality obtained by the virtual path analysis unit 2004.

This kind of virtual path analysis unit 2004 regenerates the method level graph information lost during the summarization by the multi-level analysis unit 2003, by an expression using a virtual path. This enables an improvement in essentiality with a high level of precision.

Next, the context dependent analysis unit 2005 is described. There are cases when the value of the essentiality is not desirable due to certain issues such as a conditional branching call by a method argument. The context dependent analysis unit 2005 adds context information from the originator of the call, and so processing is enabled in which a desirable essentiality is obtained even when there is a conditional branch.

Here, information that determines the receiver of a conditional branch, such as a method argument or receiver of a call, is referred to as context. The context dependent information 2013 is the information that represents how dependent relationships between the originator of the relationship and the receiver of the relationship are determined depending on the context. The context dependent information 2013 is included in the relationship graph information 410. Furthermore, the method level graph is applied when a method level graph exists, and the class level graph is applied when no method level graph exists. In either case, the processing is the same.

Figure 26:
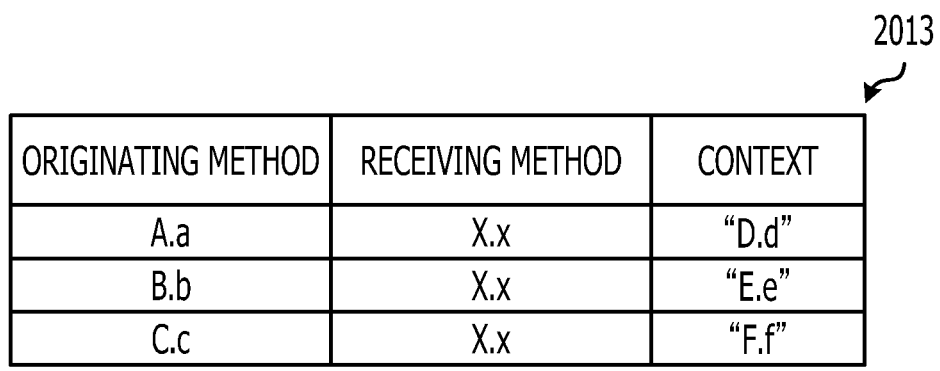
FIG. 26 is an example explanatory diagram illustrating context dependent information.

FIG. 26 is an example explanatory diagram illustrating context dependent information 2013. The context dependent information 2013 is stored in a storage device. The context dependent information 2013 is stored with the context correlated with the originating method of the relationship and its receiving method of the relationship.

Figure 27B:
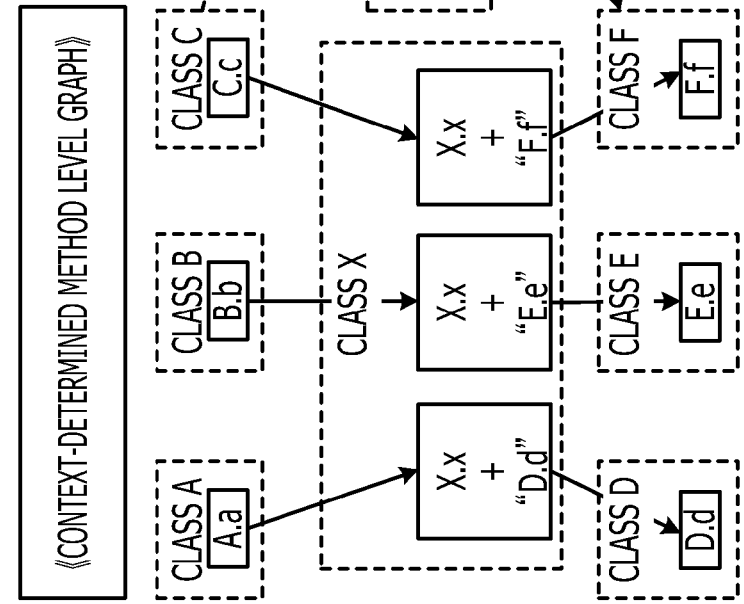
FIG. 27A and FIG. 27B are explanatory diagrams illustrating an example analysis of context dependence.
Figure 27A:
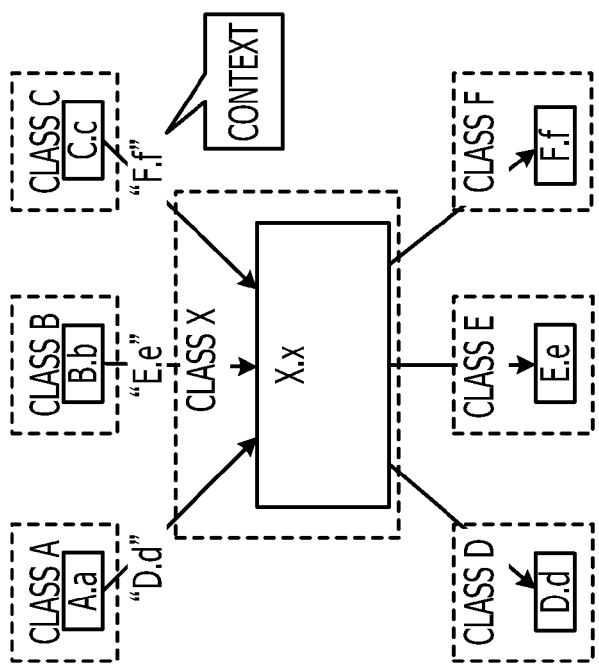

FIG. 27A and FIG. 27B are explanatory diagrams illustrating examples of the context dependent analysis, which will be described by way of example of a method level graph. FIG. 27A is a method level graph, and FIG. 27B is a method level graph containing the method level graph in FIG. 27A after context determination. Regarding FIG. 27A and FIG. 27B, method X.x conditionally branches internally by a supplied argument, and which method is called is determined. Here, arguments are simply referred to as methods, and so argument "D.d" is method D.d, "E.e" is method E.e, and "F.f" is method F.f.

The context dependent analysis unit 2005 takes receivers with context added as sets of receiver and context, so as to be newly handled as entities. Vertex division on the graph determines the context. For example, in the method level graph in FIG. 27A, the context dependent analysis unit 2005 references the context dependent information 2013 in FIG. 26 and reads out the context "D.d", "E.e", and "F.f" of the receiving method X.x.

The context dependent analysis unit 2005 divides method X.x into three entities "X.x+context." This division is not a division of the source code for method X.x, but represents the conversion of method X.x into three entities "X.x+context." with regard to the entity specifying the method X.x. This results in the context-determined method level graph depicted in FIG. 27B.

With determination of context by the context dependent analysis unit 2005, the existence of a valid virtual path between class C and class F may be determined according to the virtual path analysis unit 2004, and so this enables the addition of the virtual path. The existence of a valid virtual path between class C and class F is information that is unable to be determined through a method level graph without context. The entity divided by the context dependent analysis unit 2005 is reflected in the relationship graph information 410 and the essentiality information 420.

As an example, for the state in FIG. 27A, method A.a is the originating entity of the relationship, and method X.x is the receiving entity of the relationship, and this is registered in the relationship graph information 410. Method X.x is the originating entity of the relationship, and method D.d is the receiving entity of the relationship, and this is also registered in the relationship graph information 410.

When the context is determined by the context dependent analysis unit 2005, method X.x is divided as depicted in FIG. 27B. Therefore, the record with method A.a as the originating entity of the relationship, and method X.x as the receiving entity of the relationship is updated with method A.a as the originating entity of the relationship, and method X.x+"D.d" as the receiving entity of the relationship. Method X.x+"E.e" and method X.x+"F.f" is also the same scenario.

Also, the record with method X.x as the originating entity of the relationship, and method D.d as the receiving entity of the relationship is updated with method X.x+"D.d" as the originating entity of the relationship, and method D.d as the receiving entity of the relationship. Method X.x+"E.e" and method X.x+"F.f" is also the same scenario.

Also, the essentiality is also updated after context determination. For the example in FIG. 27A, the essentiality of the 3 edges in which method X.x is the originating entity of the relationship is ⅓ for each edge. After the determination in FIG. 27B, method X.x is divided by each context "D.d", "E.e", and "F.f", and so each essentiality is updated with 1. As a result, the dividing unit 403 may execute clustering processing using the essentiality obtained by the context dependent analysis unit 2005.

Example Division Processing Sequence

Next, the division processing sequence according to the Second Embodiment will be described. The details on the relationship extraction processing (step S1501) and the essentiality calculation processing (step S1502) in the flowchart of the example division processing sequence depicted in FIG. 15 are different from that of the First Embodiment. Therefore, the relationship extraction processing (step S1501) and the essentiality calculation processing (step S1502) are described.

Figure 28:
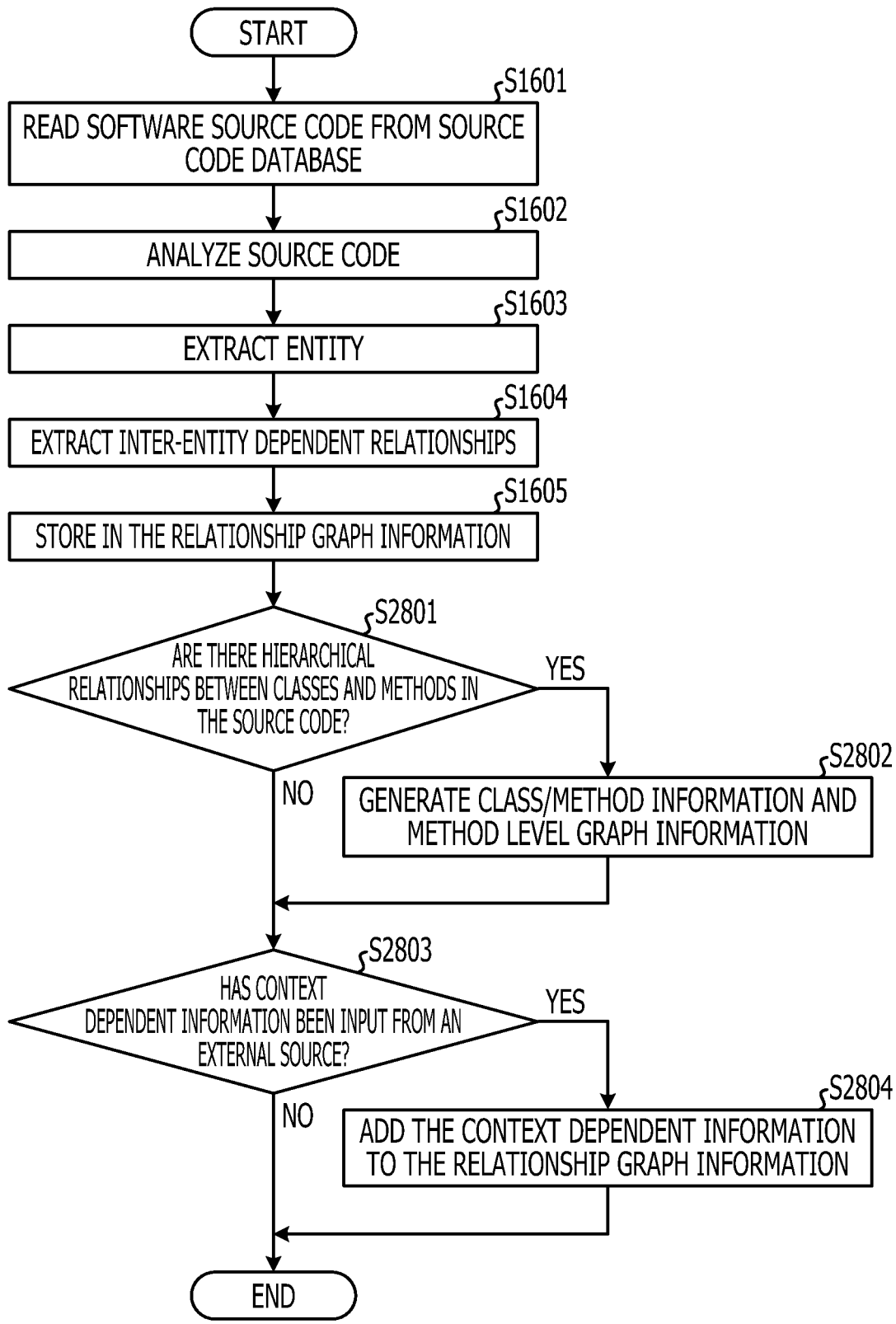
FIG. 28 is a flowchart illustrating an example relationship extraction processing sequence via a relationship extracting unit according to the Second Embodiment.

FIG. 28 is a flowchart illustrating an example relationship extraction processing sequence via the relationship extracting unit 401 according to the Second Embodiment. First, the dividing device 400 is the same as that in the First Embodiment, and executes the processing for steps S1601 through S1605. As a result, the relationship graph information 410 is generated. Furthermore, when a hierarchical relationship between classes and methods exists in the source code, the relationship graph information 410 generates a record of the classes, and the methods are generated as the method level graph information 2012.

Also, the dividing device 400 determines whether a hierarchical relationship between classes and methods exists in the source code (step S2801). When there is no hierarchical relationship (No in step S2801), processing proceeds to step S2803. In contrast, when there is a hierarchical relationship (Yes in step S2801), the dividing device 400 generates the class/method information 2011 and method level graph information 2012, and adds this to the relationship graph information 410 (step S2802), and processing proceeds to step S2803.

Also, regarding step S2803, when the context dependent information 2013 is input from an external source (Yes in step S2803), the dividing device 400 adds the context dependent information 2013 to the relationship graph information 410 (step S2804), and the relationship extraction processing terminates (step S1501). Also, when the context dependent information 2013 has not been input from an external source (No in step S2803), the relationship extraction processing (step S1501) terminates. In this way, the dividing device 400 may obtain the class/method information 2011, the method level graph information 2012, and the context dependent information 2013.

Figure 29:
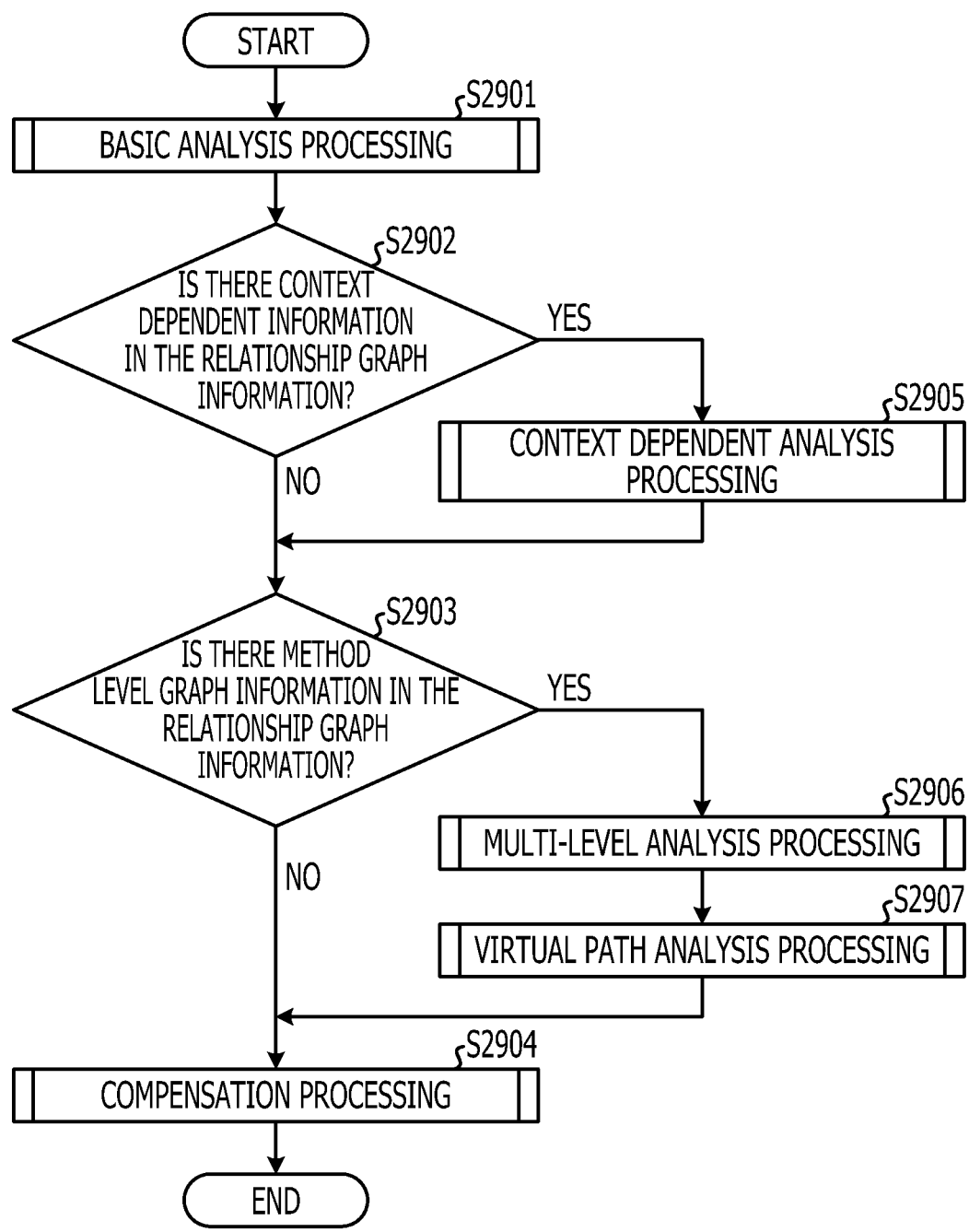
FIG. 29 is a flowchart illustrating an example essentiality calculation processing sequence via an essentiality calculation unit according to the Second Embodiment.

FIG. 29 is a flowchart illustrating an example essentiality calculation processing sequence via the essentiality calculation unit 402 as related to the Second Embodiment. First, the dividing device 400 executes the basic analysis processing via the basic analysis unit 2001 (step S2901). The details of the basic analysis processing (step S2901) are the same as the details depicted in FIG. 17, and so are not described here. The essentiality information 420 is generated by the basic analysis processing (step S2901).

After the basic analysis processing (step S2901), the dividing device 400 determines whether the context dependent information 2013 has been added to the relationship graph information 410 (step S2902). When it has not been added (No in step S2902), the dividing device 400 determines whether the method level graph information 2012 has been added to the relationship graph information 410 (step S2903). If it has not been added (No in step S2903), the dividing device 400 executes the compensation processing via the compensation processing unit 2002 (step S2904). After the compensation processing terminates (step S2904), the essentiality calculation processing also terminates. Details on the compensation processing (step S2904) are described in FIG. 30.

Also, regarding step S2902, when it has been determined that the context dependent information 2013 has been added (Yes in step S2902), the dividing device 400 executes the context dependent analysis processing via the context dependent analysis unit 2005 (step S2905). Details on the context dependent analysis processing (step S2905) are described in FIG. 31. After the context dependent analysis processing (step S2905), processing proceeds to step S2903.

Also, regarding step 2903, if it has been determined that the method level information 2012 has been added (Yes in step S2903), the dividing device 400 executes the multi-level analysis processing via the multi-level analysis unit 2003 (step S2906). Details on the multi-level analysis processing (step S2906) are described in FIG. 32. After the multi-level analysis processing (step S2906), processing proceeds to step S2907.

Also, regarding step S2907, the dividing device 400 executes the virtual path analysis processing via the virtual path analysis unit 2004 (step S2907). Details on the virtual path analysis processing (step S2907) are described in FIG. 33. After the virtual path analysis processing (step S2907), processing proceeds to step S2904.

Figure 30:
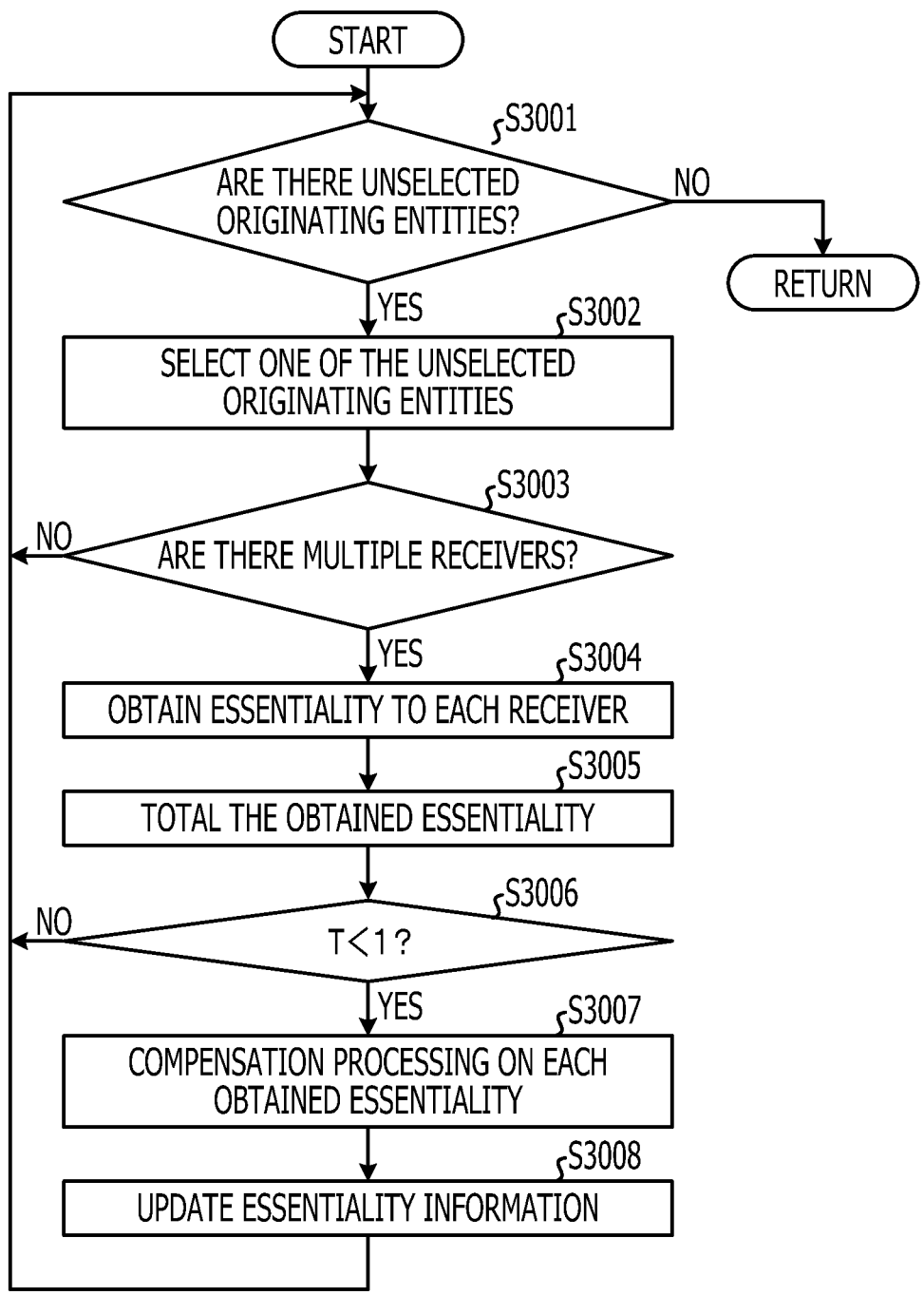
FIG. 30 is a flowchart illustrating an example of a detailed processing sequence for compensation processing (step S2904) via a compensation processing unit depicted in FIG. 29.

FIG. 30 is a flowchart illustrating a detailed processing sequence example for compensation processing (step S2904) via the compensation processing unit 2002 depicted in FIG. 29. First, regarding the compensation processing (step S2904), the dividing device 400 determines whether there are unselected originating entities of the relationship (step S3001). If there are unselected originating entities of the relationship (Yes in step S3001), the dividing device 400 selects one of the unselected originating entities of the relationship (step S3002). Next, the dividing device 400 references the relationship graph information 410, and determines if there are multiple receiving entities of the relationship for the originating entity of the relationship (hereafter, selected entity) selected at step S3002 (step S3003). If there are no multiples (No in step S3003), processing returns to step S3001. However, if there are multiples (Yes in step S3003), the dividing device 400 obtains the essentiality from the selected entity to each receiving entity of the relationship from the essentiality information 420 (step S3004).

The dividing device 400 then totals the obtained essentiality (step S3005). This total essentiality is represented as T. The dividing device 400 then determines whether T is less than 1 (step S3006). If T is not less than one (No in step S3006), processing returns to step S3001. However, if T is greater than 1 (Yes in step S3006), the dividing device 400 executes the compensation processing for each essentiality obtained at step S3005 (step S3007).

Specifically, the dividing device 400 calculates the post-compensation essentiality for each obtained essentiality using the Expression (9), for example. Next, the dividing device 400 updates the calculated essentiality in the essentiality information 420 (step S3008), and processing returns to step S3001. Also, regarding step S3001, if there are no unselected originating entities of the relationship (No in step S3001), the compensation processing (step S2904) terminates. When the originating entity of the relationship has relationships with multiple entities, there is a potential that any of these entities are essential to the originating entity. Therefore, when the total essentiality T to the receiver of the relationship is less than 1, the dividing device 400 assumes that the essentiality has been estimated too low, and so intentionally increases the essentiality. As a result, the dividing device 400 may compensate for a relationship that is essential.

Figure 31:
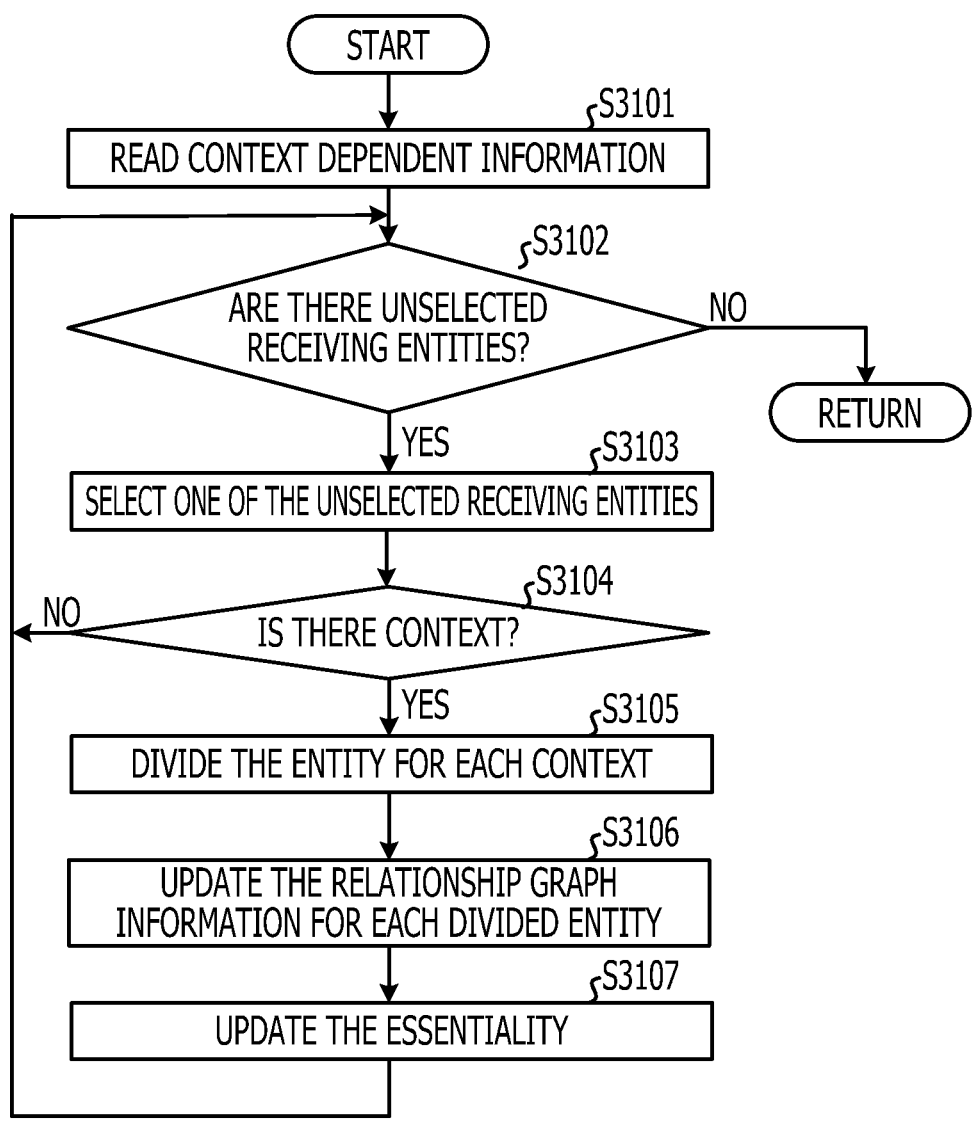
FIG. 31 is a flowchart illustrating an example of a detailed processing sequence for context dependent analysis processing (step S2905) via a context dependent analysis unit depicted in FIG. 29.

FIG. 31 is a flowchart illustrating a detailed processing sequence example for context dependent analysis processing (step S2905) via the context dependent analysis unit 2005 depicted in FIG. 29. First, regarding the context dependent analysis processing (step S2905), the dividing device 400 reads the context dependent information 2013 (step S3101). Next, regarding the context dependent analysis processing (step S2905), the dividing device 400 determines whether there are unselected receiving entities of the relationship (step S3102). If there are unselected receiving entities of the relationship (Yes in step S3102), the dividing device 400 selects one of the unselected receiving entities of the relationship (step S3103).

Next, the dividing device 400 references the context dependent information 2013, and determines whether the receiving entity of the relationship selected in step S3103 has context (step S3104). If there is no context (No in step S3104), processing returns to step S3102. However, if there is context (Yes in step S3104), the dividing device 400 divides the selected entity for each context, depicted in FIG. 27B (step S3105).

The dividing device 400 then updates the relationship graph information 410 with each divided entity divided at step S3105 (step S3106). Specifically, as described above, the record with method A.a as the originating entity of the relationship and method X.x as the receiving entity of the relationship is updated with method A.a as the originating entity of the relationship and method X.x+"D.d" as the receiving entity of the relationship.

Also, the record with method X.x as the originating entity of the relationship and method D.d as the receiving entity of the relationship is updated with method X.x+"D.d" as the originating entity of the relationship and method D.d as the receiving entity of the relationship.

Also, the dividing device 400 updates the essentiality for the record of the relationship graph information 410 that has been updated in step S3106 (step S3107). Specifically, as described above in FIG. 27A, the essentiality of the 3 edges of method X.x as the originating entity of the relationship is ⅓ for each edge. After determination as depicted in FIG. 27B, method X.x is divided for each context "D.d", "E.e", and "F.f", and so each essentiality is updated to 1.

Processing then returns to step S3102. Regarding step S3102, if there are no unselected receiving entities of the relationship (No in step S3102), the dividing device 400 terminates the context dependent analysis processing (step S2905). As a result, the contents of the context determination may be reflected in the relationship graph information 410 and the essentiality information 420.

As a result, the dividing device 400 may obtain a desirable essentiality even when there is conditional branching through the adding of the context from the originator of a call and context determination. Context determination also increases the chance to add the virtual path via the virtual path analysis unit 2004.

Figure 32:
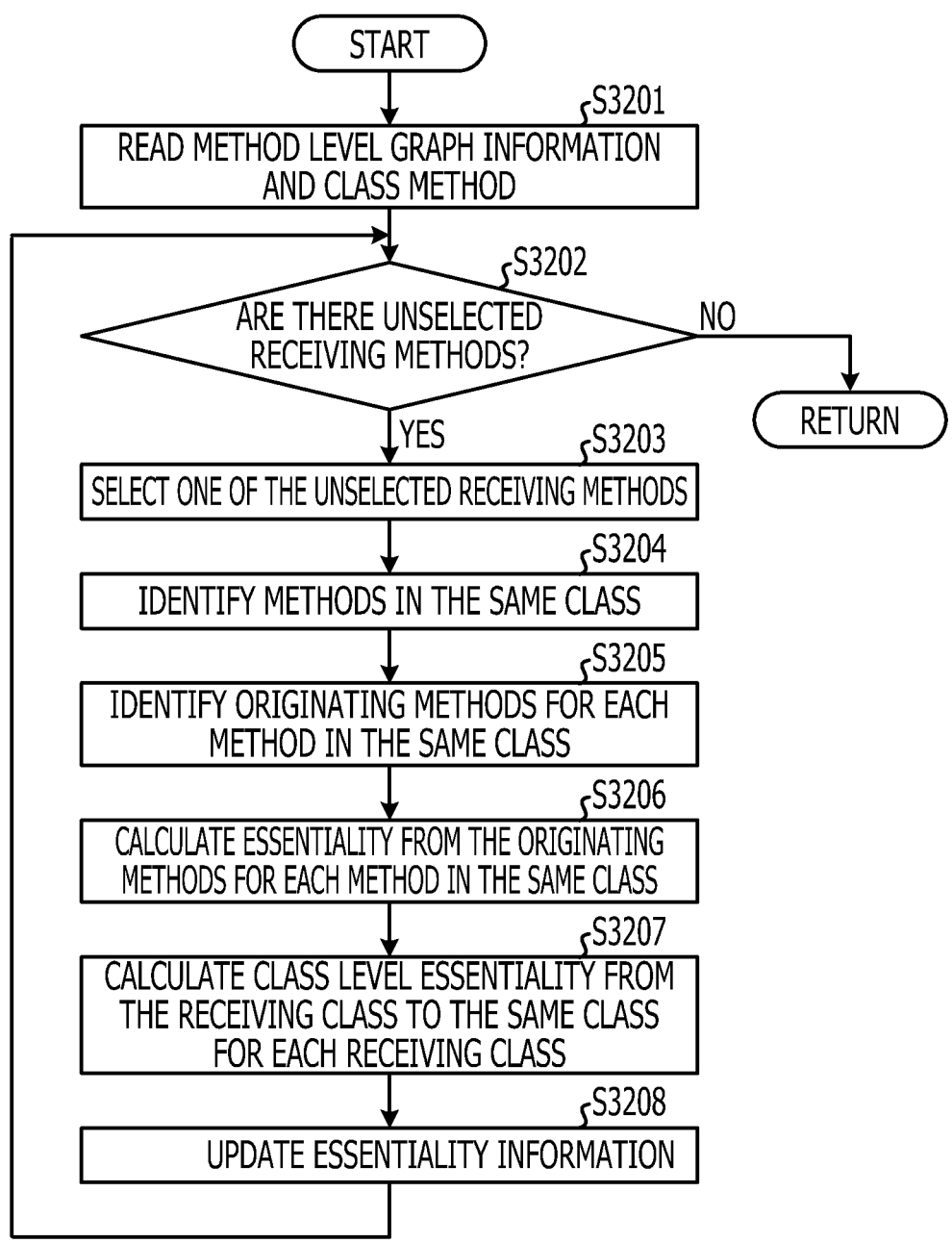
FIG. 32 is a flowchart illustrating an example of a detailed processing sequence for multi-level analysis processing (step S2906) via a multi-level analysis unit depicted in FIG. 29.

FIG. 32 is a flowchart illustrating a detailed processing sequence example for multi-level analysis processing (step S2906) via the multi-level analysis unit 2003 depicted in FIG. 29. First, regarding the multi-level analysis processing (step S2906), the dividing device 400 reads the method level graph information 2012 and the class/method information 2011 (step S3201). Next, regarding the multi-level analysis processing (step S2906), the dividing device 400 references the method level graph information 2012, and determines whether there are any methods which are unselected receiving entities of the relationship (hereafter, receiving method of the relationship) (step S3202). If there are receiving methods of the relationship (Yes in step S3202), the dividing device 400 selects one of the unselected receiving methods of the relationship (step S3203).

Next, the dividing device 400 identifies the class to which the selected receiving method of the relationship belongs from the class/method information 2011, and identifies the method within the identified class (hereinafter also referred to as "its class") from the class/method information 2011 (step S3204). For example, if the selected receiving method of the relationship is method B.c, the class to which method B.c belongs is class B. Therefore, methods B.d and B.e are identified as belonging to class B.

Also, the dividing device 400 identifies the methods in this class that are the originating entities of the relationship (hereafter, originating method of the relationship) from the method level graph information 2012 (step S3205). For example, the methods B.c, B.d, and B.e are identified in its class at step S3204. Therefore, from the method level graph information 2012, the dividing device 400 identifies methods A.a, A.b, C.f, and C.g as the originating methods of the relationship for methods B.c, B.d, and B.e.

The dividing device 400 then calculates the essentiality from the originating method of the relationship for each method in its class (step S3206). For example, the essentiality for the receiving methods of the relationship B.c, B.d, and B.e is calculated using the Expression (1), and are listed as follows: E (A.a, B.c), E (A.b, B.e), E (C.f, B.c), E (C.f, B.d), and E (C.g, B.e).

After this, the dividing device 400 calculates the essentiality, at the class level, from the receiving class of the relationship to this class for each class (hereafter, receiving class of the relationship) to which the receiving methods of the relationship belongs using the Expression (10) (step S3207). In the example above, the class level essentiality E (A, B) from the receiving class of the relationship A to this class B is calculated, the class-level essentiality E (C, B) from the receiving class of the relationship C to this class B is calculated.

After this, the dividing device 400 updates the essentiality information 420 (step S3208), and processing returns to step S3202. In the example above, the essentiality in the record with class A as the receiving entity of the relationship and class B as the originating entity of the relationship is updated with the class level essentiality calculated at step S3207. The record with class C as the receiving entity of the relationship and class B as the originating entity of the relationship is handled in the same way.

Also, regarding step S3202, if there are no unselected receiving methods of the relationship (No in step S3202), the multi-level analysis processing (step S2906) terminates. By executing this multi-level analysis processing (step S2906), the inter-class relationships, which are one level of abstraction higher, may be summarized, which enables the obtaining of an essentiality with a potential to be analyzed at a higher level of precision.

Figure 33:
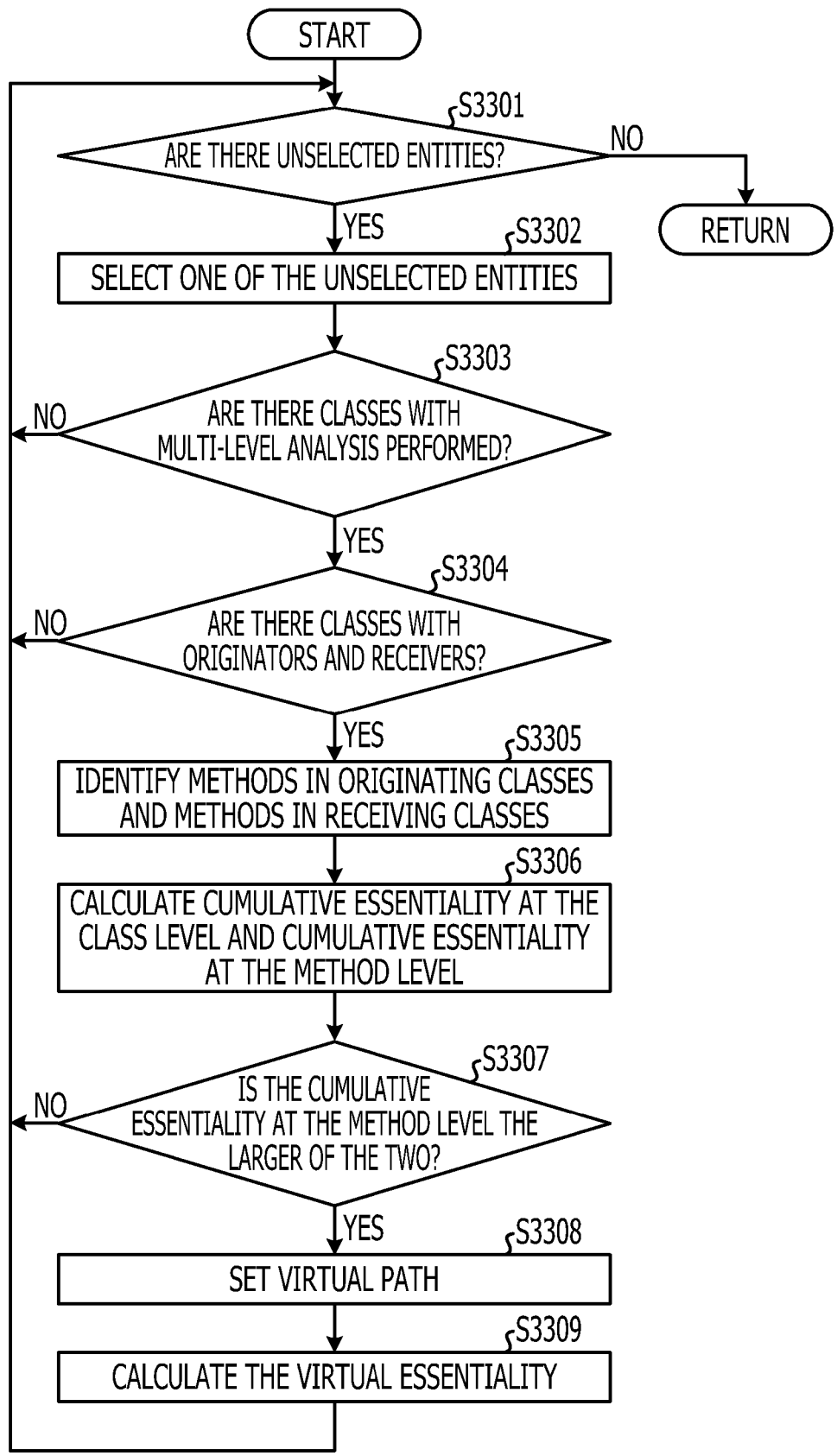
FIG. 33 is a flowchart illustrating an example of a detailed processing sequence for virtual path analysis processing (step S2907) via a virtual path analysis unit depicted in FIG. 29.

FIG. 33 is a flowchart illustrating a detailed processing sequence example for virtual path analysis processing (step S2907) via the virtual path analysis unit 2004 depicted in FIG. 29. First, regarding the virtual path analysis processing (step S2907), the dividing device 400 determines whether there are unselected entities (step S3301). If there are unselected entities (Yes in step S3301), the dividing device 400 selects one of the unselected entities (step S3302). Next, the dividing device 400 determines whether the selected entity has already had multi-level analysis performed, by referencing for a flag indicating that the multi-level analysis has been performed, which has been added to the relationship graph information 410 (step S3303).

If the multi-level analysis has not been performed (No in step S3303), processing returns to step S3301. However, if the multi-level analysis has been performed (Yes in step S3303), the dividing device 400 determines whether the selected entity, which is a class, has any classes as the originating entity of the relationship or as the receiving entity of the relationship (step S3304). For example, if class X in FIG. 25 has had multi-level processing performed, the dividing device 400 identifies classes A, B, and C as the originating entities of the relationship for class X, and classes D, E, and F as the receiving entities of the relationship for class X.

If there are no classes as the originating entity of the relationship or the receiving entity of the relationship (No in step S3304), processing returns to step S3301. However, if there are classes as the originating entity of the relationship or the receiving entity of the relationship (Yes in step S3304), the dividing device 400 identifies the methods in classes as the originating entity of the relationship, and the methods in classes as the receiving entity of the relationship (step S3305).

In the example in FIG. 25, classes A, B, and C are identified as the originating entities of the relationship for class X, and classes D, E, and F are identified as the receiving entities of the relationship for class X. Therefore, method A.a of class A, method B.b of class B, method C.c of class C, method D.d of class D, method E.e of class E, and method F.f of class F are identified.

After this, the dividing device 400 calculates both the cumulative essentiality at the class level and at the method level (step S3306). In the example in FIG. 25, the essentiality for method X.z regarding the method level graph is E (C.c, X.z)=1, and E (X.z, F.f)=1. Therefore, the cumulative essentiality from method C.c to method F.f is E (C.c, X.z)×E (X.z, F.f)=1×1=1. However, regarding the class level graph, the cumulative essentiality from class C to class F is E (C, X)×E (X, F)=⅓. The dividing device 400 calculates methods X.x and X.y in the same way.

Next, the dividing device 400 determines whether the cumulative essentiality at the method level is larger than the cumulative essentiality at the class level (step S3307). If it is not larger (No in step S3307), processing returns to step S3301. However, if it is larger (Yes in step S3307), it is understood that information has been lost by changing the level of abstraction to the class level during multi-level analysis. In the example described above, the cumulative essentiality from method C.c to method F.f is E (C.c, X.z)×E (X.z, F.f)=1, and the cumulative essentiality from class C to class F is E (C, X)×E (X, F)=⅓. Therefore, the cumulative essentiality at the method level is the larger of the two.

Next, if the cumulative essentiality at the method level is larger than the cumulative essentiality at the class level (Yes in step S3307), the dividing device 400 sets the virtual path (step S3308). In the above example, as the information is compensated by changing the level of abstraction to the class level, the dividing device 400 virtually sets an edge between class C and class F as the virtual path. If the cumulative essentiality at the method level is larger than the cumulative essentiality at the class level, the dividing device 400 sets the virtual path for the edges from class A to class D and from class B to class E. The virtual path is added as a record to the relationship graph information 410.

Also, the dividing device 400 calculates the virtual essentiality through the virtual path (step S3309). In the above example, the virtual essentiality is Ev (C, F), and so is calculated as Ev (C, F)=(cumulative essentiality from method C.c to method F.f)=1. When the virtual path is set for the edges from class A to class D and from class B to class E, the dividing device 400 calculates the virtual essentiality Ev (A, D) and the virtual essentiality Ev (B, E) in the same way. The flow then returns to step S3301.

Also, regarding step S3301, if there are no unselected entities (No in step S3301), the virtual path analysis processing (step S2907) terminates. By executing this virtual path analysis processing (step S2907), the method level graph information lost during summarization by the multi-level analysis unit 2003 may be regenerated with an expression using a virtual path. Therefore, an improvement in the level of precision for the essentiality may be achieved.

In this way, according to the Second Embodiment, when the originating entity of the relationship has relationships with multiple entities, there is a potential that any of these entities are essential to its entity, and so the total essentiality for dependent relationships from the originating entity of the relationship may be compensated when it is too low. Also, by the context analysis, a desirable essentiality may be obtained even for cases of conditional branching. Also, inter-class relationships at one level of abstraction higher may be summarized, and this enables the obtaining of an essentiality with a potential for a higher level of precision in analysis.

Also, method level graph information lost during summarization by the multi-level analysis unit 2003 may be regenerated with an expression using a virtual path. In this way, according to the Second Embodiment, the precision for the essentiality is improved, and so enables an improvement in the precision of dividing software.

Third Embodiment

Next, a Third Embodiment is described. The Third Embodiment is an example of a word list that adds features to the divided software, as an aid to analysis of the set of entities obtained as a result of the software divided with the First and Second Embodiments.

Example Functional Configuration of Dividing Device 400

Figure 34:
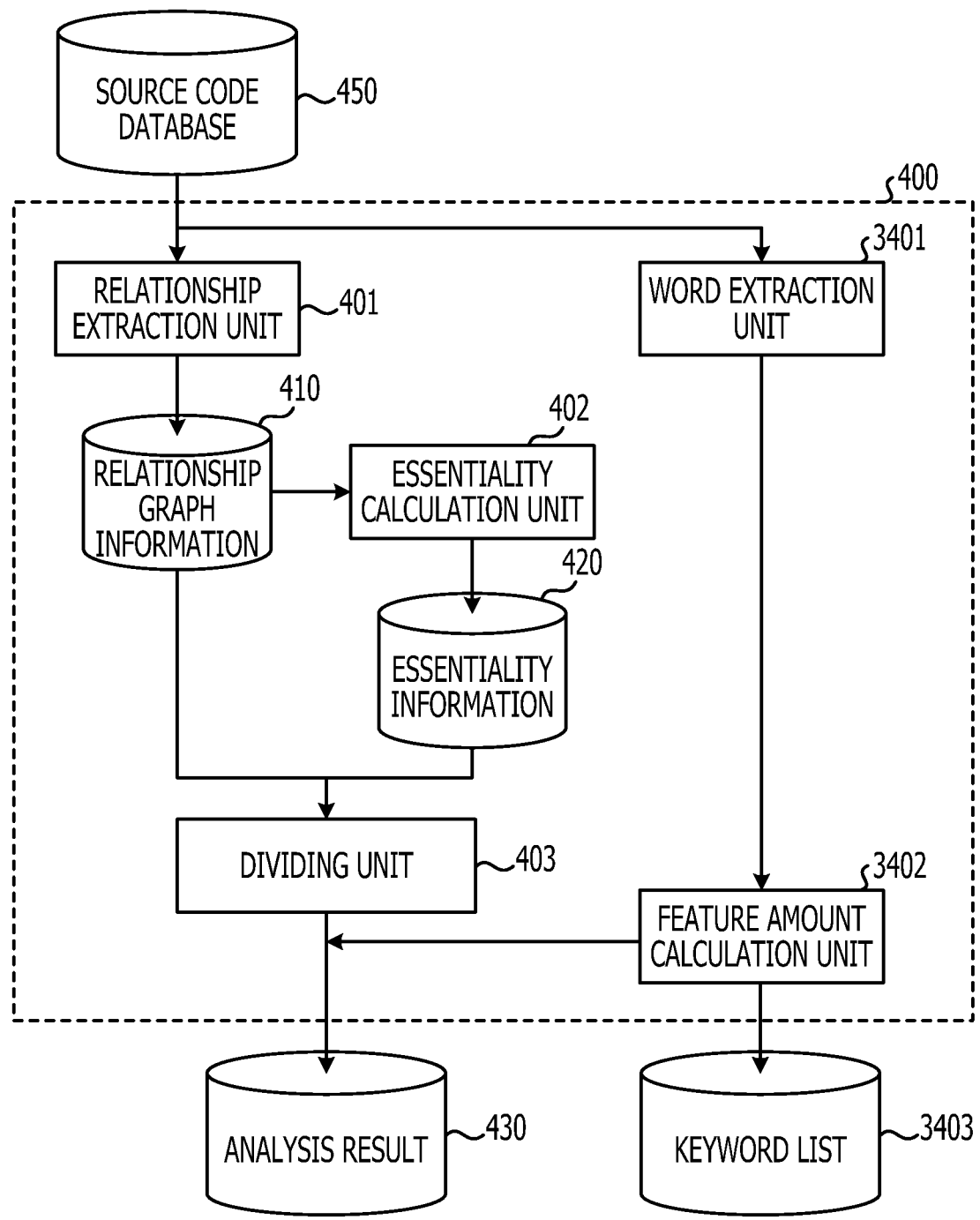
FIG. 34 is a block diagram illustrating an example of a functional configuration of a division device according to a Third Embodiment.

FIG. 34 is a block diagram illustrating a functional configuration of the dividing device 400 as related to the Third Embodiment. Regarding FIG. 34, the dividing device 400 according to the Third Embodiment is different from the dividing device 400 according to the First Embodiment with the addition of a word extraction unit 3401 and a feature amount calculation unit 3402. Specifically, the word extraction unit 3401 and the feature amount calculation unit 3402 are, for example, functions that exist as programs stored on a recording medium such as the ROM 302, the RAM 303, the magnetic disk 305, the optical disc 307, or similar as depicted in FIG. 3, which are executed by the CPU 301 or through the I/F 309. Furthermore, FIG. 34 describes an example of adding the word extraction unit 401 and the feature amount calculation unit 3402 to the dividing device 400 according to the First Embodiment, but these functions may also be added to the dividing device 400 according to the Second Embodiment.

The word extraction unit 3401 reads the software source code from the source code database 450, and analyzes the source code using currently existing lexical and syntax analysis technologies, and natural language processing technologies to extract the words. Next, the word extraction unit 3401 records the number of uses of the word in each entity in a word list. The word list is a table containing three items: the entity, the word, and the use count. The word list is stored in a storage device.

From the analysis result 430 obtained by clustering, the feature amount calculation unit 3402 obtains information on entities belonging to each cluster. Next, the feature amount calculation unit 3402 searches entities belonging to each cluster, and using the word list created by the word extraction unit 3401, searches for the use count of a word in each cluster, and records the result in a cluster word list. The cluster word list is a table containing 3 items: the cluster, the word, and the use count. The cluster word list is stored in a storage device.

Also, the feature amount calculation unit 3402 calculates the feature amount of the word. The feature amount is, for example, the frequency (use count) or the value of tf (term frequency)–idf (inverse document frequency). Generally, the tf–idf value is an index that identifies the level of features that a particular word appearing in text provides. For the example in the Third Embodiment, one cluster is handled as one document. Therefore, the tf–idf value is an index that identifies the level of features that a word appearing in a cluster in the software source code provides.

As a specific example of the obtaining method, the $tf_{ij}$ for a certain word i and a certain cluster j is obtained by separating the number of times word i appears in cluster j from the number of times all words appear in cluster j. Also, $idf_i$ for word i is obtained by taking the log of the value for which the cluster number that includes word i is separated from the cluster total. The feature amount calculation unit 3402 may then obtain the tf–idf value for a certain word i by multiplying $tf_{ij}$ by $idf_i$.

After this, the feature amount calculation unit 3402 extracts the word with the highest feature amount from each cluster, creates a high order list, and outputs this as a keyword list. The criteria determining the high words is configurable by the user. For example, the criteria may be set to words that have a feature amount value over a threshold, or a list of the 50 words with the highest feature amount. Also, the keyword list is table containing 4 items: cluster, order, word, and feature amount. The keyword list is stored in a storage device. FIG. 35 is an explanatory diagram illustrating an example of a keyword list.

Example Division Processing Sequence

Figure 36:
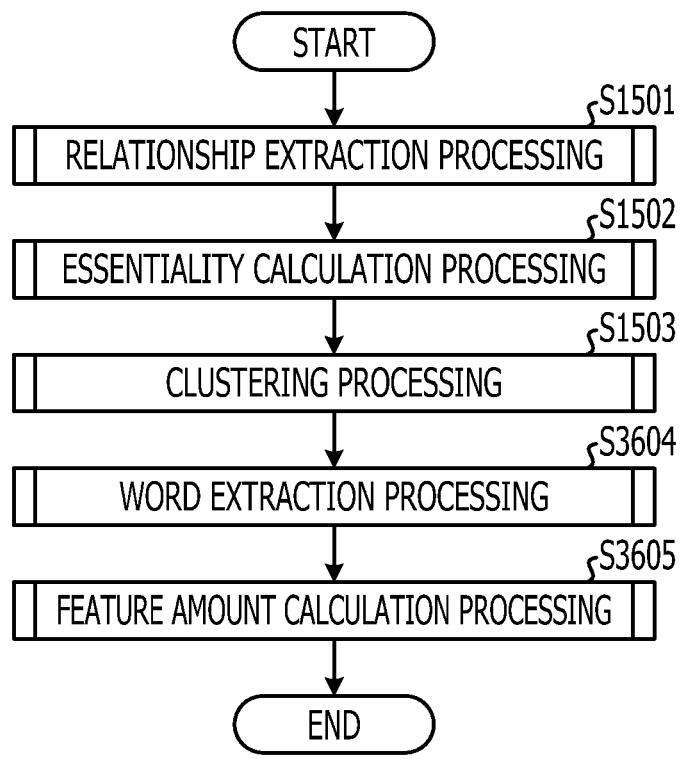
FIG. 36 is a flowchart illustrating an example division processing sequence according to the Third Embodiment.

FIG. 36 is a flowchart illustrating an example division processing sequence according to the Third Embodiment. Regarding FIG. 36, the dividing device 400 executes the relationship extraction processing (step S1501), the essentiality calculation processing (step S1502), the clustering processing (step S1503), the word extraction processing (step S3604), and the feature amount calculation processing (step S3605). The relationship extraction processing (step S1501), the essentiality calculation processing (step S1502), and the clustering processing (step S1503) are the same as that of the First and Second Embodiments, and so are removed from the description here. Also, details on the word extraction processing (step S3604) are described in FIG. 37, and the details on the feature amount calculation processing (step S3605) are described in FIG. 38.

Figure 37:
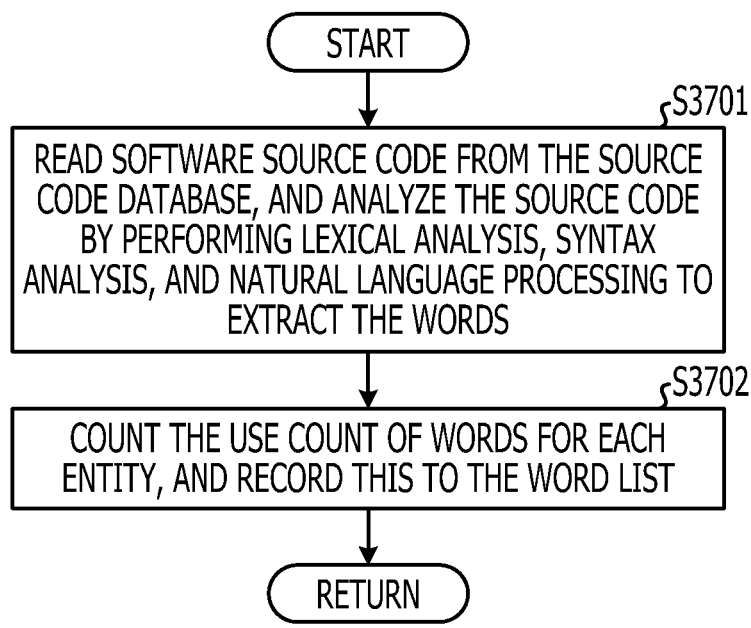
FIG. 37 is a flowchart illustrating an example of a detailed processing sequence for word extraction processing (step S3604) via a word extraction unit.

FIG. 37 is a flowchart illustrating a detailed processing sequence example for word extraction processing (step S3604) via the word extraction unit 3401. First, the dividing device 400 reads the software source code from the source code database 450, analyzes the source code using existing lexical and syntax analysis technologies, and natural language processing technologies to output a word (step S3701). Next, the dividing device 400 counts the usage number of the word extracted at step S3701 for each entity, and records this to the word list (step S3702). As a result, the word extraction processing (step S3604) terminates. By this word extraction processing (step S3604), the use count of each word for each entity may be obtained.

Figure 38:
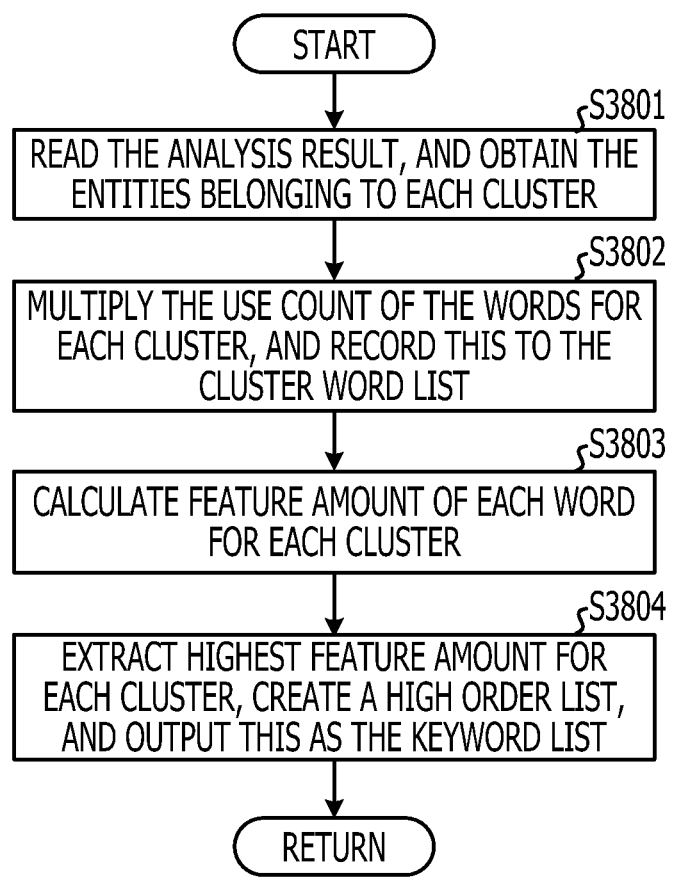
FIG. 38 is a flowchart illustrating an example of a detailed processing sequence for feature amount calculation processing (step S3605) via a feature amount calculation unit.

FIG. 38 is a flowchart illustrating a detailed processing sequence example for feature amount calculation processing (step S3605) via the feature amount calculation unit 3402. First the dividing device 400 reads the analysis result 430 obtained from the dividing unit 403, and obtains the entities belonging to each cluster (step S3801). Using cluster 1 as an example from the examples in FIG. 13 and FIG. 14, classes C2, C5, C6, C11, and C14, which are the entities belonging to cluster 1, are obtained.

Next, the dividing device 400 references the word list for each cluster, extracts the use count for each word at each entity belonging to the cluster, totals the usage count for each word for each cluster, and records this to the cluster word list (step S3802). Next, the dividing device 400 calculates the feature amount of each word for each cluster (step S3803). After this, the dividing device 400 extracts the words that have the highest feature amount, creates a high order list, and outputs this as the keyword list (step S3804). As a result, the feature amount calculation processing (step S3605) terminates.

By this feature amount calculation processing (step S3605), a list of words with the highest usage count in the cluster is created, and so it may be understood which words have a high usage frequency in which clusters, and this enables the user to easily speculate what kind of processing is executed at clusters from the words with a high usage frequency.

As described above, according to the First through Third Embodiments, software may be automatically divided into small scale clusters, based on the dependent relationships in the software. The mutual dependent relationships, which are based on essentiality, in clusters are dense, and have a high degree of modularity, which is said to be sparse between clusters. Also, dependent relationships in clusters, which are essential for the software to perform specific functions or work may be selected.

Therefore, by referencing clusters, it becomes easy to understand the functional structure of software. Also, by the servicing of software, segmentation of parts to be transferred, and making software compatible with the level of developers' working knowledge, this may be used to discover differences in optimal maintenance staff assignment and documentation of work/functions versus actual work/functions.

Also, methods related to related art, such as initially deleting dependent relationships that have a low priority, or methods that requests the analyzer to have certain knowledge to perform the analysis, are able to analyze software with tens of thousands of lines of code, but are unable to analyze software such as commercial systems with millions of lines of code. According to the present embodiment, millions of lines of code or more may be clustered in a realistic time period of a few minutes to a few hours.

Also, according to the First through Third Embodiments described above, the essentiality has been calculated by the essentiality calculation unit 402 and the basic analysis unit 2001, but instead of calculating the essentiality, a previously assigned weight may be applied to dependent relationships in place of the essentiality. For example, a weight categorizing classes and methods may be used. In this case, the dividing unit 403 clusters by using the applicable weight in the same way as when using the essentiality.

Also, according to the Second Embodiment described above, when the originating entity of the relationship has relationships with multiple entities, the compensation processing unit 2002 automatically compensates the essentiality as there is a potential than any of the multiple entities are essential to its entity. Also, according to the Second Embodiment described above, the function of the compensation processing unit 2002 has been described using entities, but processing by the compensation processing unit 2002 may be executed in the same way using subentities such as methods.

Also, according to the Second Embodiment described above, when inter-class relationships are analyzed, the multi-level analysis unit 2003 performs the analysis using more detailed inter-method relationship information, and this summarizes the inter-class relationships, which is one level of abstraction higher. Therefore, an essentiality with a higher level of precision in analysis may be obtained, and enables an improvement in the precision of software division.

Also, according to the Second Embodiment, the virtual path analysis unit 2004 regenerates the method level graph information lost during the summarization performed by the multi-level analysis unit 2003, with an expression using a virtual path. In this way, the missing information is restored with the virtual path, and this enables an essentiality with a potential to be analyzed with a higher level of precision to be obtained, and so enables an improvement in the precision of software division.

Also, according to the Second Embodiment described above, the context dependent analysis unit 2005 adds context from the originator of a call. As a result, when the subentity with context added is the receiving entity of the relationship, the essentiality of the receiving entity of the relationship for each context may be obtained. Also, when the subentity with added context is the originating entity of the relationship, the essentiality of the originating entity of the relationship for each context may be obtained in the same way. Therefore, the basic analysis unit 2001 may obtain a desirable essentiality even when there is conditional branching.

Also, the context dependent analysis unit 2005 has been described using an example applicable to subentities, but this may also be applied to entities. In this case for example, the "originating method of the relationship" from the context dependent information 2013 in FIG. 26 becomes the "originating class of the relationship", and the "receiving method of the relationship" becomes the "receiving class of the relationship."

Also, according to the Third Embodiment, the feature amount of words appearing in clusters may be obtained, and this enables support of understanding source code at the cluster unit.

As described above, the dividing device, the dividing method, and the dividing program enables an improvement in the level of precision of software division.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A dividing device comprising:
   a memory configured to store a program; and
   a processor coupled to the memory, the processor configured to execute a process by the program, the process including:
   extracting correlation information from source code of software, the information correlating relationships between an originating entity of a relationship and a receiving entity of the relationship, which are identified by dependent relationships of a group of entities, which is the group of elements that structure the software, and
   dividing the group of entities into clusters, so as to be included in a cluster a lot of the dependent relationships for which a weight related to the dependent relationships is large, based on the weight related to the dependent relationships identified by the correlation information extracted by the extracting,
   wherein the dividing includes:
   dividing the group of entities into clusters, wherein a total weight related to the dependent relationships is larger than the expected value of the weight, based on the weight related to the dependent relationships identified by the correlation information extracted by the extracting.

2. The dividing device according to claim 1, the process further comprising:
   extracting words appearing in any of the entities in the group of entities, and the appearance rate of these words, from the source code,
   calculating a feature amount of the words in any of the clusters, based on the appearance count of words appearing in the entities belonging to any of the clusters, and
   outputting the words appearing in any of the clusters, based on the feature amount.

3. The dividing device according to claim 2, wherein the outputting includes outputting of the words where the feature amount is at or over a threshold, or the words in a predetermined, high order list.

4. A dividing device comprising:
   a memory configured to store a program; and
   a processor coupled to the memory, the processor configured to execute a process by the program, the process including:

extracting correlation information from source code of software, the information correlating relationships between an originating entity of a relationship and a receiving entity of the relationship, which are identified by dependent relationships of a group of entities, which is the group of elements that structure the software, and dividing the group of entities into clusters, so as to be included in a cluster a lot of the dependent relationships for which a weight related to the dependent relationships is large, based on the weight related to the dependent relationships identified by the correlation information extracted by the extracting, wherein the dividing includes:

combining multiple subgraphs selected from a set of subgraphs which include each entity, obtaining a value of an assessment function that calculated the difference between a total weight related to the dependent relationships included in each subgraph in the set of subgraphs, and the expected value of this weight totaled based on the subgraphs, concerning the set of subgraphs before and after the combining, and outputting the set of combined subgraphs as the clusters, when there are combinations with an assessment function value larger than before the combination.

5. A dividing device comprising:

a memory configured to store a program; and a processor coupled to the memory, the processor configured to execute a process by the program, the process including:

extracting correlation information from source code of software, the information correlating relationships between an originating entity of a relationship and a receiving entity of the relationship, which are identified by dependent relationships of a group of entities, which is the group of elements that structure the software, dividing the group of entities into clusters, so as to be included in a cluster a lot of the dependent relationships for which a weight related to the dependent relationships is large, based on the weight related to the dependent relationships identified by the correlation information extracted by the extracting, and calculating an essentiality related to the dependent relationships concerning the originating entity of the relationship, which represents the degree of how essential the dependent relationships are for the originating entity of the relationship to fulfill its role, based on the number of originating entities of the relationship that have the dependent relationships with the receiving entity of the relationship, and on the referencing of the correlation information, and wherein the dividing includes dividing of the group of entities into the clusters, using the essentiality calculated by the calculating as the weight.

6. The dividing device according to claim 5, wherein the calculating includes calculating the essentiality which decreases the essentiality depending on the size of the indegree of the entity.

7. The dividing device according to claim 5, the process further comprising:

compensating the essentiality related to each of the multiple entities concerning a certain one of the entities, based on the total essentiality related to the dependent relationship between a certain one of the entities and each one of the multiple entities, when an entity in the group of entities has a dependent relationship with multiple entities, as the receiver of the relationship, and wherein the dividing includes dividing of the group of entities into the clusters, based on the essentiality which has received the compensating.

8. The dividing device according to claim 5, the process further comprising:

referencing correlation information related to subentities correlated with an originating subentity of the relationship and a receiving subentity of the relationship, which are identified by the dependent relationships concerning a group of subentities, when any group of entities has one or more subentities, and calculating the essentiality related to a certain one of the entities concerning one of the multiple entities, based on the number of subentities in the certain one of the entities, and the number of subentities in a certain one of the entities that becomes the originator of the relationship inclusive to any of the multiple entities, when a subentity in a certain entity in the group of entities is the receiver of the relationship with a subentity within multiple entities, wherein the dividing includes dividing of the group of entities into the clusters, based on the essentiality which has received the calculating.

9. The dividing device according to claim 8, the process further comprising:

obtaining a first cumulative essentiality by accumulating the essentiality related to a second subentity inclusive to a second entity concerning a first subentity inclusive to a first entity, and the essentiality related to a third subentity inclusive to a third entity concerning the second subentity, obtaining a second cumulative essentiality by accumulating the essentiality related to the second entity concerning the first entity, and the essentiality related to the third entity concerning the second entity, and when the second cumulative essentiality is smaller than the first cumulative essentiality, generating new correlation information which configures the first entity as the originator of the relationship and the third entity as the receiver of the relationship to the first entity, and linking the new correlation information with the first cumulative essentiality, wherein the dividing includes dividing of the group of entities into the clusters, based on the first cumulative essentiality linked with the new corresponding information.

10. The dividing device according to claim 5, the process further comprising:

extracting, for each of the multiple entities, context, which is information in which the originator of the relationship specifies conditional branching with the receiver of the relationship, and is correlated with a receiver of the relationship common to multiple entities, from context dependent information which correlates an originator of the relationship, a receiver of the relationship, and the context, generating entities with the context, which is the context added from the common receiver of the relationship, and generating correlation information with the multiple entities as the originators of the relationship, and with the context-added entities, which the context correlating with the originators of the relationship has been added, as the receiver of the relationship, wherein the calculating includes referencing the generated correlation information and calculates the essentiality related to context-added entities, which are receivers of the relationship concerning the originators of the relationship, and the dividing includes dividing of the group of entities into the clusters, based on the essentiality related to the context-added entity, which isare the receivers of the relationship concerning the originators of the relationship.

11. The dividing device according to claim 10, wherein the generating includes generating of correlation information with the context-added entities as the originators of the relationship, and an entity specified by the context in the context-added entity as the receiver of the relationship, the calculating includes referencing the correlation information obtained by the extracting, and calculating the essentiality related to the receiver of the relationship concerning the context-added entity, which is the originator of the relationship, and the dividing includes dividing of the group of entities into the clusters, based on the essentiality related to the receiver of the relationship concerning the context-added entity, which is the originator of the relationship.

12. The dividing device according to claim 5, the process further comprising:

extracting, with regard to a group of subentities that exists when any of the group of entities includes at least one subentity, context corresponding to the receiving subentity of the relationship common to multiple subentities inclusive with different entities, and which is information specifying that the originating subentity of the relationship has conditional branching with the receiver of the relationship, from the context dependent information correlating an originating subentity which is identified by a dependent relationship, the receiving subentity of the relationship, and the context, for each of the multiple subentities, generating context-added subentities, which have the context from the common receiving subentity of the relationship added, and generating correlation information related to the subentity, with each of the subentities in the multiple subentities as the originators of the relationship, and with the context-added subentity, which has the context correlated with this subentity, as the receiving subentity of the relationship, wherein the calculating includes referencing the correlation information related to the generated subentity and calculating the essentiality related to the context-added subentity, which is the receiver of the relationship, concerning the originating subentity of the relationship, and wherein the dividing includes dividing of the group of subentities into the clusters, according to the essentiality related to the context-added subentity, which is the receiver of the relationship, concerning the originating subentity of the relationship.

13. The dividing device according to claim 12, wherein the generating includes generating of correlation information related to the subentity with the context-added subentity as the originating subentity of the relationship, and with the subentity specified by the context in the context-added subentity as the receiving subentity of the relationship, and wherein the calculating includes referencing the correlation information related to the generated subentity and calculates the essentiality related to the receiving subentity of the relationship concerning the context-added subentity, which is the originator of the relationship, and wherein the dividing includes dividing of the group of subentities into the clusters, based on the essentiality related to the receiving subentity of the relationship concerning the context-added subentity, which is the originator of the relationship.

14. A dividing method comprising:

extracting correlation information with a processor, the correlation information correlating originating entities of the relationship specified by dependent relationships concerning a group of entities which is a group of elements that structure software, with receiving entities, from the software source code stored in a storage device; and dividing the group of entities into multiple clusters with the processor, so as to be included in a cluster a lot of the dependent relationships for which a weight related to the dependent relationships is large, based on the weight related to the dependent relationships defined by the extracted correlation information, wherein the dividing including:

dividing the group of entities into multiple clusters wherein a total weight related to the dependent relationship is larger than the expected value for this total weight, based on the weight related to the dependent relationship defined by the extracted correlation information.

15. A dividing method comprising:

extracting correlation information with a processor, the correlation information correlating originating entities of the relationship specified by dependent relationships concerning a group of entities which is a group of elements that structure software, with receiving entities, from the software source code stored in a storage device; and dividing the group of entities into multiple clusters with the processor, so as to be included in a cluster a lot of the dependent relationship which a weight related to the dependent relationships is large, based on the weight related to the dependent relationships defined by the extracted correlation information, wherein the dividing includes:

combining multiple subgraphs selected from a set of subgraphs which include each entity, obtaining a value of an assessment function that calculated the difference between a total weight related to the dependent relationships included in each subgraph in the set of subgraphs, and the expected value of this weight totaled based on the subgraphs, concerning the set of subgraphs before and after the combining, and outputting the set of combined subgraphs as the multiple clusters, when there are combinations with an assessment function value larger than before the combination.

16. A dividing method comprising:

extracting correlation information with a processor, the correlation information correlating originating entities of the relationship specified by dependent relationships concerning a group of entities which is a group of elements that structure software, with receiving entities, from the software source code stored in a storage device;

dividing the group of entities into multiple clusters with the processor, so as to be included in a cluster a lot of the dependent relationships for which a weight related to the dependent relationship is large, based on the weight related to the dependent relationships defined by the extracted correlation information;

calculating an essentiality related to the dependent relationships concerning the originating entity of the relationship, which represents the degree of how essential the dependent relationships are for the originating entity of the relationship to fulfill its role, based on the number of originating entities of the relationship that have the dependent relationships with the receiving entity of the relationship, and on the referencing of the correlation information, and wherein the dividing includes dividing of the group of entities into the multiple clusters, using the essentiality calculated by the calculating as the weight.

17. The dividing method according to claim 16, wherein the calculating includes calculating of the essentiality in which decreases the essentiality depending on the size of the indegree of the entity.

18. A non-transitory computer-readable recording medium storing a program causes an apparatus to execute a process, the process comprising:

extracting correlation information, from software source code stored in a storage device, the information correlating relationships between an originating entity of the relationship, which ads identified by dependent relationships of a group of entities, which is the group of elements that structure the software; and dividing the group of entities into multiple clusters, so as to be included in the cluster a lot of the dependent relationships for which a weight related to the dependent relationships is large, based on the weight related to the dependent relationships identified by the extracted correlation information, wherein the dividing includes:

dividing the group of entities into multiple clusters wherein a total weight related to the dependent relationships is larger than the expected value for this total weight, based on the weight related to the dependent relationships defined by the extracted correlation information.

19. A non-transitory computer-readable recording medium storing a program causes an apparatus to execute a process, the process comprising:

extracting correlation information, from software source code stored in a storage device, the information correlating relationships between an originating entity of the relationship, which are identified by dependent relationships of a group of entities, which is the group of elements that structures the software;

dividing the group of entities into multiple clusters, so as to be included in a cluster a lot of the dependent relationships for which a weight related to the dependent relationships is large, based on the weight related to the dependent relationships identified by the extracted correlation information; and calculating an essentiality related to the dependent relationships concerning the originating entity of the relationship, which represents the degree of how essential the dependent relationships are for the originating entity of the relationship to fulfill its role, based on the number of originating entities of the relationship that have the dependent relationships with the receiving entity of the relationship, and on the referencing of the correlation information, and wherein the dividing includes dividing of the group of entities into the multiple clusters, using the essentiality calculated by the calculating as the weight.

\* \* \* \* \*

UNITED STATES PATENT AND TRADEMARK OFFICE
CERTIFICATE OF CORRECTION

| | | |
|---|---|---|
| PATENT NO. | : 9,129,002 B2 | Page 1 of 1 |
| APPLICATION NO. | : 13/740704 | |
| DATED | : September 8, 2015 | |
| INVENTOR(S) | : Kenichi Kobayashi | |

It is certified that error appears in the above-identified patent and that said Letters Patent is hereby corrected as shown below:

In the claims,

Claim 10, Column 31, Line 6

Delete "isare" and insert --are--, therefor.

Claim 18, Column 33, Line 24

Delete "ads" and insert --is--, therefor.

Signed and Sealed this
First Day of December, 2015

Michelle K. Lee
*Director of the United States Patent and Trademark Office*